(12) United States Patent
Aisu et al.

(10) Patent No.: US 8,233,774 B2
(45) Date of Patent: Jul. 31, 2012

(54) VIDEO RECORDER AND METHOD OF PROCESSING RECORDING SCHEDULE

(75) Inventors: Hideyuki Aisu, Kawasaki (JP); Tomoyuki Miura, Oume (JP); Takashi Doi, Fuchu (JP); Toshiaki Tanaka, Oume (JP); Hiroyuki Kamio, Tachikawa (JP); Masatoshi Murakami, Hamura (JP); Yoshio Kataoka, Kawasaki (JP); Akinori Ohta, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 918 days.

(21) Appl. No.: 12/267,236

(22) Filed: Nov. 7, 2008

(65) Prior Publication Data

US 2009/0136206 A1 May 28, 2009

(30) Foreign Application Priority Data

Nov. 9, 2007 (JP) ................................ P2007-291623

(51) Int. Cl.
*H04N 5/93* (2006.01)
(52) U.S. Cl. ........................................ 386/291; 386/292
(58) Field of Classification Search .................. None
See application file for complete search history.

(56) References Cited

U.S. PATENT DOCUMENTS

| | | | | |
|---|---|---|---|---|
| 6,601,237 B1* | 7/2003 | Ten Kate et al. | ................ | 725/47 |
| 6,859,845 B2* | 2/2005 | Mate | ................................ | 710/5 |
| 7,369,750 B2* | 5/2008 | Cheng et al. | ................... | 386/292 |
| 7,543,325 B2* | 6/2009 | Westbrook et al. | ............. | 725/93 |
| 7,610,586 B2* | 10/2009 | Ismail et al. | ................... | 718/104 |
| 7,840,116 B2* | 11/2010 | Suzuki et al. | ................. | 386/291 |
| 7,917,008 B1* | 3/2011 | Lee et al. | ....................... | 386/291 |
| 2002/0164155 A1* | 11/2002 | Mate | ............................... | 386/96 |
| 2002/0184638 A1* | 12/2002 | Agnihotri et al. | ............... | 725/89 |
| 2003/0154485 A1* | 8/2003 | Johnson et al. | .................. | 725/89 |
| 2004/0078817 A1* | 4/2004 | Horowitz et al. | ............... | 725/58 |
| 2005/0005300 A1* | 1/2005 | Putterman et al. | .............. | 725/89 |
| 2006/0280434 A1* | 12/2006 | Suzuki et al. | ................... | 386/83 |
| 2007/0058924 A1* | 3/2007 | Yeh | ................................. | 386/46 |
| 2008/0232767 A1 | 9/2008 | Aisu et al. | | |
| 2009/0052863 A1* | 2/2009 | Parmar et al. | ................... | 386/83 |
| 2009/0222875 A1* | 9/2009 | Cheng et al. | .................. | 725/147 |

FOREIGN PATENT DOCUMENTS

JP 11-313280 11/1999
(Continued)

OTHER PUBLICATIONS

Briggs et al, Coloring Register Pairs, ACM Letters of Programming Languages and Systems, (LOPLAS) archive, vol. 1, p. 3-13, 1992.

(Continued)

*Primary Examiner* — William C Vaughn, Jr.
*Assistant Examiner* — Gelek W Topgyal
(74) *Attorney, Agent, or Firm* — Turocy & Watson, LLP

(57) ABSTRACT

A video recorder includes a schedule reconfiguration section having: a local deterioration determining module that determines whether a local deterioration in a recording state occurs by performing simulating the recording state obtained when the reallocated resources are used for performing the programmed recordings and comparing the simulated recording state with a recording state obtained when the resources before the reallocation is used for performing the programmed recordings; and an allocation restoring module that restores the reallocated resources at a part causing the local deterioration to the resources allocated before the reallocation when the local deterioration determining module determines the occurrence of the local deterioration.

8 Claims, 21 Drawing Sheets

FOREIGN PATENT DOCUMENTS

| | | |
|---|---|---|
| JP | 2006-324776 | 11/2006 |
| JP | 2007-013679 | 1/2007 |
| JP | 2007-13713 | 1/2007 |
| JP | 2007-19834 | 1/2007 |

OTHER PUBLICATIONS

Japanese Office Action for Japanese Application No. 2007-291623 issued on Feb. 7, 2012.

* cited by examiner

FIG.2

| ITEM | EXAMPLE |
|---|---|
| CHANNEL | 1 |
| PROGRAM TITLE | SMILE AND GO! |
| START DATE AND TIME | 2007/03/03/20:00 |
| END DATE AND TIME | 2007/03/03/21:00 |
| PRIORITY (1-5) | 3 |
| CURRENT RECORDING RESOURCE ID (NAME) | R1 |
| DESIRED RECORDING RESOURCE ID (NAME) | R2 |
| REALLOCATION (Y/N) | Y |
| RESOURCE PATTERN ID (NAME) | P1 |
| ... | ... |

FIG.4

EXAMPLE OF DEFINITION OF RECORDING RESOURCE

| RESOURCE ID | FIRST FUNCTIONAL COMPONENT | SECOND FUNCTIONAL COMPONENT | THIRD FUNCTIONAL COMPONENT |
|---|---|---|---|
| R1 | DIGITAL TUNER A | FORMATTER A | |
| R2 | DIGITAL TUNER B | FORMATTER B | |
| R3 | DIGITAL TUNER A | FORMATTER C | H.264 TRANSCODER |
| R4 | DIGITAL TUNER B | FORMATTER C | H.264 TRANSCODER |
| R5 | ANALOG TUNER | FORMATTER C | MPEG2 ENCODER |

FIG.5

EXAMPLE OF DEFINITION TABLE OF EXCLUSION
RELATIONSHIP OF RECORDING RESOURCE

|    | R1 | R2 | R3 | R4 | R5 |
|----|----|----|----|----|----|
| R1 | ×  | ○  | ×  | ○  | ○  |
| R2 | ○  | ×  | ○  | ×  | ○  |
| R3 | ×  | ○  | ×  | ×  | ×  |
| R4 | ○  | ×  | ×  | ×  | ×  |
| R5 | ○  | ○  | ×  | ×  | ×  |

FIG.6

EXAMPLE OF DEFINITION OF RESOURCE PATTERN

| RESOURCE PATTERN ID | RECORD MODE | RESOURCE SET THAT CAN BE USED |
|---|---|---|
| P1 | DIGITAL BROADCAST | R1, R2 |
| P2 | DIGITAL BROADCAST ·H.264 DESIGNATION | R3, R4 |
| P3 | ANALOG BROADCAST | R5 |

VIDEO RECORDER AND METHOD OF PROCESSING RECORDING SCHEDULE

CROSS-REFERENCE TO THE RELATED APPLICATION(S)

The present disclosure relates to the subject matters contained in Japanese Patent Application No. 2007-291623 filed on Nov. 9, 2007, which are incorporated herein by reference in its entirety.

FIELD

The invention relates to a video recorder capable of performing simultaneous programmed recording for recording a plurality of broadcast programs and a method for performing the programmed recording.

BACKGROUND

Recently, video recorders such as digital versatile disk (DVD) recorders or hard disk (HD) recorders that record a broadcast program have become provided with a plurality of recording resources and capable of performing simultaneous programmed recording for recording a plurality of broadcast programs having time slots that overlap with one another. An example of such video recorders is disclosed in JP-2007-013713-A.

As a home computer network has become more popular, it is planned to introduce into market a video recorder capable of performing sophisticated cooperative process for cooperating with other devices through the network and operating to: exchange schedule information about programmed recording; share the information to perform the programmed recording while not recording the same program with those to be recorded by other recorders; and perform video recording by functionally cooperate with a plurality of external tuners and external hard disk drives (HDDs). In those sophisticated video recorders, it is preferred to automatically allocate shared recording resources, which is shared by a plurality of devices, in order to ease a user's setting operation.

In order to increase the user's degree of freedom in a recording operation, it is considered to provide a product having a specification in which a user can manually select recording resources even while an automatic allocation is used or confirm the types of recording resources currently allocated to each of the schedules for performing the programmed recordings any time on a GUI.

In such a case, when local deterioration is generated, in which a schedule that was set to be recordable when the user entered the schedule becomes partially deteriorated or becomes unable to be recorded after an automatic allocation change, the user can easily find the schedule causing the local deterioration. Thus, even when the evaluation for the whole schedule group is improved in, for example, the number of schedules succeeded in the programmed recordings, the user would become less satisfactory.

In addition, when a schedule (a conflicting counterpart of a recording resource) that causes another schedule to be unrecordable is changed in allocation by the automatic allocation, the user's satisfaction may become lowered even in a case where the unrecordable schedule was already unrecordable before the automatic allocation is performed by being misunderstood by the user that the unrecordable schedule became unrecordable by the automatic allocation. When a video recorder is shared by a plurality of users, each of the users considers that the user's own schedules should be most highly prioritized. Accordingly, the local deterioration can easily become a reason for lowering each of the users' satisfaction.

Therefore, when recording resources are automatically reallocated to a plurality of related schedules altogether in accordance with an operation, such as a newly entered schedule, cancellation of other schedules, or changing recording time frame of other schedules, occurrence of the local deterioration from a state before the reallocation by the automatic allocation should be prevented.

SUMMARY

According to a first aspect of the invention, there is provided a video recorder including: a schedule input section that is configured to register a plurality of schedules for performing programmed recordings to record desired programs; a program recording section that performs the programmed recordings in accordance with the schedules registered by the schedule input section; and a schedule reconfiguration section that reconfigures the schedules by: determining an occurrence of a conflict when both of first and second conditions are satisfied, wherein the first condition is satisfied when a first time slot in which a first program included in a given schedule included in the schedules is to be broadcasted and a second time slot in which a second program included in other schedule included in the schedules is to be broadcasted overlap with each other, and wherein the second condition is satisfied when a first resource that is to be used for recording the first program and a second resource that is to be used for recording the second program overlap with each other; and concurrently performing, when the conflict is determined, a reallocation of resources to be used for performing the programmed recordings for the schedules that are affected by a resource allocated to be used for performing the programmed recording for the first schedule based on information representing exclusion relationships between the first schedule and the second schedule, wherein the schedule reconfiguration section includes: a local deterioration determining module that determines whether a local deterioration in a recording state occurs by performing simulating the recording state obtained when the reallocated resources are used for performing the programmed recordings and comparing the simulated recording state with a recording state obtained when the resources before the reallocation is used for performing the programmed recordings; and an allocation restoring module that restores the reallocated resources at a part causing the local deterioration to the resources allocated before the reallocation when the local deterioration determining module determines the occurrence of the local deterioration.

According to a second aspect of the invention, there is provided a method for processing a plurality of schedules for performing programmed recordings to record programs for which start time and end time are designated, the method including: determining an occurrence of a conflict when both of first and second conditions are satisfied, wherein the first condition is satisfied when a first time slot in which a first program included in a given schedule included in the schedules is to be broadcasted and a second time slot in which a second program included in other schedule included in the schedules is to be broadcasted overlap with each other, and wherein the second condition is satisfied when a first resource that is to be used for recording the first program and a second resource that is to be used for recording the second program overlap with each other; concurrently performing, when the conflict is determined, a reallocation of resources to be used for performing the programmed recordings for the schedules that are affected by a resource allocated to be used for performing the programmed recording for the first schedule based on information representing exclusion relationships between the first schedule and the second schedule; determining whether a local deterioration in a recording state occurs by performing simulating the recording state obtained when the reallocated resources are used for performing the programmed recordings and comparing the simulated recording state with a recording state obtained when the resources before the reallocation is used for performing the programmed recordings; and restoring the reallocated resources at a part causing the local deterioration to the resources allocated before the reallocation when the local deterioration determining module determines the occurrence of the local deterioration.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 2 is a table showing an example of a data format of schedule registration data of the video recorder according to the first embodiment of the invention.

FIG. 4 is a table showing an example of definition of recording resources of a video recorder according to the first embodiment of the invention.

FIG. 5 is a table showing an example of definition of an exclusion relationship of recording resources in a video recorder according to the first embodiment of the invention.

FIG. 6 is a table showing an example of definition of resource patterns of the video recorder according to the first embodiment of the invention.

DETAILED DESCRIPTION OF THE EMBODIMENTS

Figure 1:
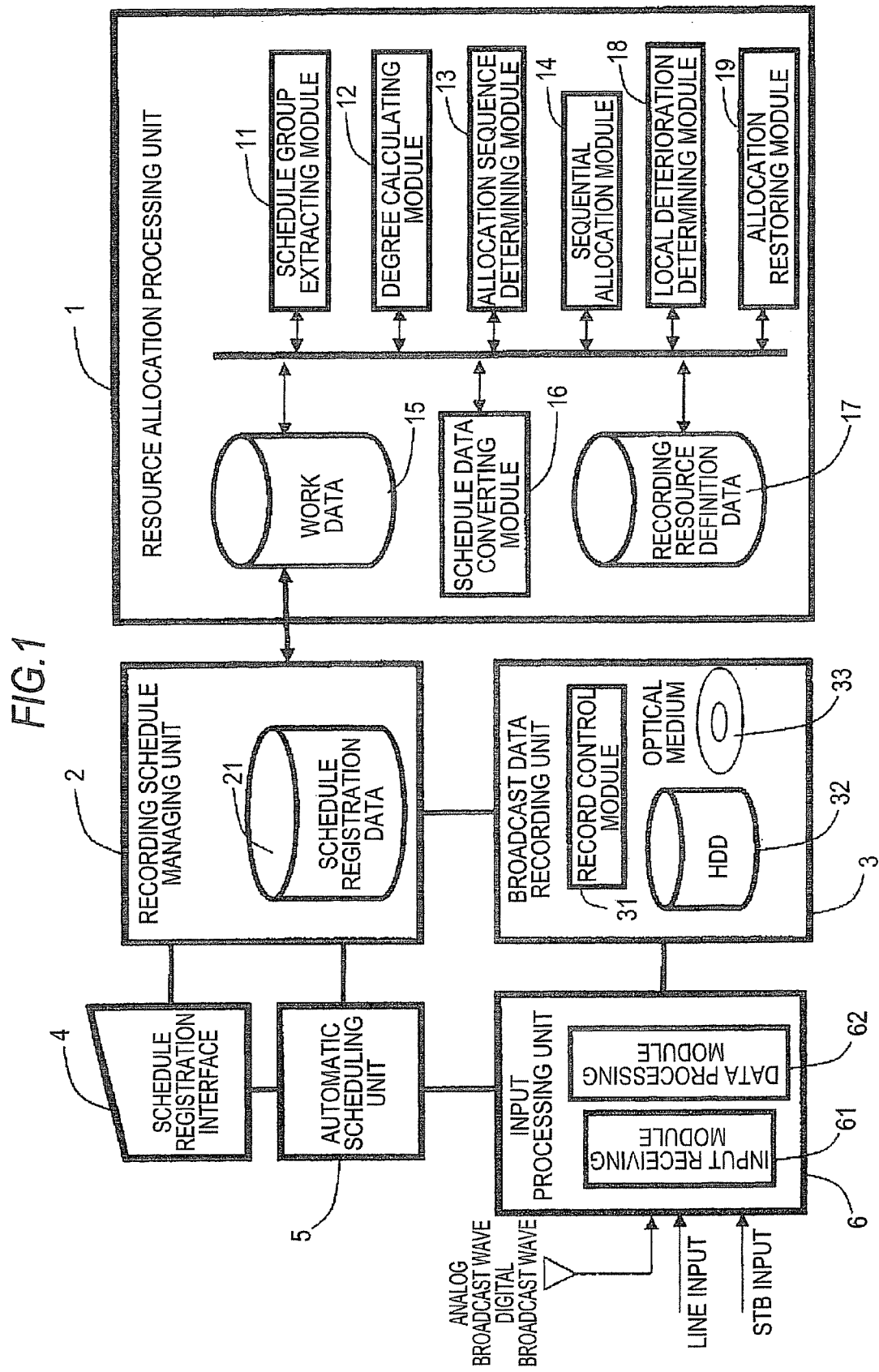
FIG. 1 is a schematic block diagram showing a video recorder according to a first embodiment of the invention.

Hereinafter, embodiments of the invention will be described with reference to the drawings. In the following description, the same or similar components will be denoted by the same reference numerals, and the duplicate description thereof will be omitted.

First Embodiment

FIG. 1 is a functional block diagram showing a configuration of a video recorder according to a first embodiment of the invention. Each of the functional blocks described below may be implemented by executing a program in a computer or may be implemented as hardware.

As shown in FIG. 1, the video recorder has a resource allocation processing unit 1. The resource allocation processing unit 1 has a schedule group extracting module 11, a degree calculating module 12, an allocation sequence determining module 13, a sequential allocation module 14, a schedule data converting module 16, a local deterioration determining module 18, an allocation restoring module 19, and a memory module that stores work data 15 and recording resource definition data 17.

The schedule group extracting module 11 extracts a schedule group that influences resource allocation of an added, removed, or changed schedule from schedule data. The degree calculating module 12 calculates the degree of a schedule based on resource exclusion definition data (information representing exclusion relationship among resources that are used for a record process) that is a part of the recording resource definition data 17 and resource exclusion relationship between the resource of the schedule and a resource set of another schedule of which time slot is overlapped with that of the schedule. The degree will be described in detail later. The allocation sequence determining module 13 determines an appropriate sequence for allocating resources to schedules based on the degree and priority of schedules. The sequential allocation module 14 performs an allocation operation in accordance with the determined allocation sequence such that the exclusion relationship between the resources allocated to other conflicting schedules for which allocation has been completed and those of the schedule is satisfied.

The local deterioration determining module 18 and the allocation restoring module 19 are peculiar means of the invention. The local deterioration determining module 18 compares a recording state that occurs in a case where the reallocated resources for the schedules are used with a recording state before reallocation and determines whether there is local deterioration of the recording state. When there is local deterioration, the allocation restoring module 19 restores a part that causes the local deterioration to resource allocation before the reallocation.

The video recorder according to the first embodiment further has a recording schedule managing unit 2, a broadcast data recording unit 3, a schedule registration interface 4, an automatic scheduling unit 5, an input processing unit 6.

The schedule registration interface 4 is an interface for registering a desired recording schedule by allowing a user to select a desired program from an electronic program guide (EPG) or to directly input a start time and end time for recording the desired program. The schedule registration interface 4 may allow the user to input the desired program through a remote control and a TV (television) screen, or by use of a personal computer PC) connected to the schedule registration interface 4.

The automatic scheduling unit 5 automatically extracts a program including a keyword designated in advance in a detailed description of the program in the electronic program guide or a program determined to be favored by a user based on a preference learning function from the program guide and reserving and registering the extracted program.

The recording schedule managing unit 2 manages registered schedule information and includes a recording medium for managing schedule registration data 21.

The input processing unit 6 has a function for selectively receiving broadcast data and converting the broadcast data into recordable data. The input processing unit 6 has: an input receiving module 61 that receives a digital input signal from a tuner or a set-top box (STB) that receives broadcast waves; and a data processing module 62 that converts the digital input signal into a recordable format. A part of the functions provided by the input processing unit 6 may serve as a part of the recording resource that is automatically allocated by the resource allocation processing unit 1.

The broadcast data recording unit 3 includes a hard disk drive (HDD) 32 or a DVD drive 33 used for recording the broadcast data and a record control module 31 that performs a control operation. The recording medium may be a video tape, a high capacity flash memory, or the like. A part of the functions provided by the broadcast data recording unit 3 may serve as a part of the recording resource that is automatically allocated by the resource allocation processing unit 1.

In the video recorder according to the first embodiment, the schedule registration interface 4 and the automatic scheduling unit 5 serve as a schedule input section that is configured to register a plurality of schedules for performing programmed recordings to record desired programs. The recording schedule managing unit 2, the broadcast data recording unit 3, and the input processing unit 6 serve as a program recording section that performs the programmed recordings in accordance with the schedules registered by the schedule input section. The resource allocation processing unit serves as a schedule reconfiguration section that reconfigures the schedules.

Next, the schedule registration data 21 according to this embodiment shown in FIG. 2 as an example will be described. The schedule registration data at least has information used for determining start time and end time, information used for determining whether a resource can be reallocated, and resource pattern information used for determining a set of recording resources that can be used. In addition, as shown in the example shown in FIG. 2, the schedule registration data may include information on a channel, a program title, priority of recording, a recording resource that is currently allocated, a desired recording resource, and the like.

Figure 3:
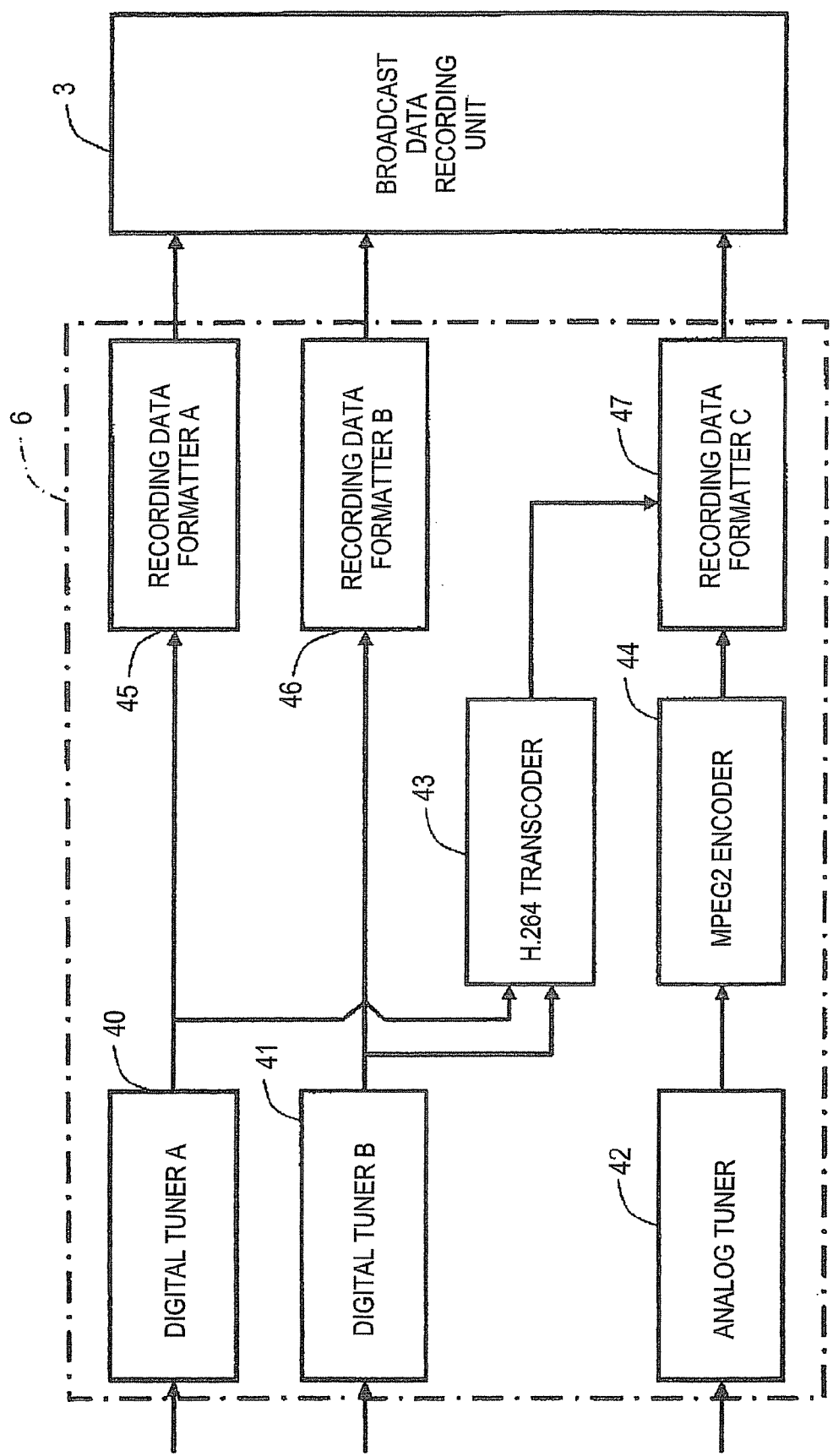
FIG. 3 is a block diagram showing an example of the configuration of an input processing unit shown in FIG. 1.

Now, a description for the recording resource and the resource pattern will be supplemented with reference to FIGS. 3 to 6. FIG. 3 shows one configuration example of the input processing unit 6 shown in FIG. 1. The input processing unit includes tuners A40 and B41 that receive digital broadcast waves, a tuner 42 that receives an analog broadcast wave, an H.264 transcoder 43 that is used for recompressing a digital signal into an H.264 format, an MPEG2 encoder 44 that compresses an analog signal into an MPEG2 format for digitalization, recording data formatters A45 and B46 that buffer a digital broadcast signal and convert the digital broadcast signal into a format that is writable to the recording medium, and a recording data formatter C47 that buffers the compressed signal and converts the compressed signal into a format that can be writable to the recording medium.

FIG. 4 is an example in which a management ID is assigned to each recording resource shown in FIG. 3. In descriptions for this embodiment, the recording resource does not represent an individual tuner or the like and is treated as a combination of several functional components to be used concurrently at a time when a record operation is performed. For example, a recording resource R1 represents a combination of the digital tuner A and the formatter A, and a recording resource R3 represents a combination of the digital tuner A, the formatter C, and the H.264 transcoder. FIG. 5 represents an exclusion relationship (no concurrent usability) of recording resources in a case where the recording resources shown in FIG. 4 are defined. In the figure, "o" denotes concurrent usability, and "x" denotes no concurrent usability. For example, when the recording resource R1 is used, recording resources R2, R4, and R5 do not have a functional component that conflicts with that of the recording resource R1, and accordingly, there is no exclusion relationship therebetween. However, the recording resource R3 cannot be concurrently used together with the recording resource R1. In addition, when the recording resource R5 is used, the formatter C is occupied, and accordingly, the recording resources R3 and R4 cannot be used.

FIG. 6 is an example of definition of resource patterns determining a set of recording resources that can be used. The resource patterns of several types are defined in advance in accordance with attributes of a program to be reserved, a record mode that can be designated by a user, and the like. In this example, three types of the resource patterns are defined depending on whether each program is digital broadcast or analog broadcast and whether the record mode is normal or H.264.

The examples shown in FIGS. 3 to 6 are only shown for describing the details of the video recorder according the first embodiment, and descriptions hereinafter will be made based on the examples. However, the recording resources according to the invention may have any configuration, combination, and exclusion relationship of functional components.

Figure 7:
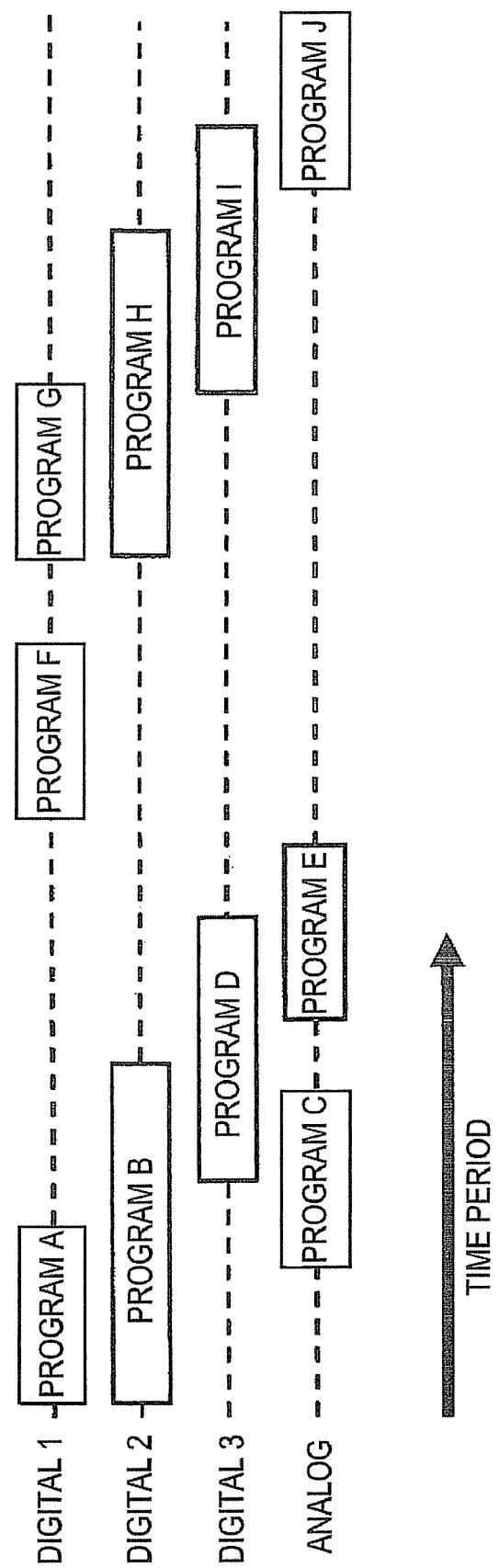
FIG. 7 is a diagram represented in a time series showing an example of schedule registration of the video recorder according to the first embodiment of the invention.
Figure 8:
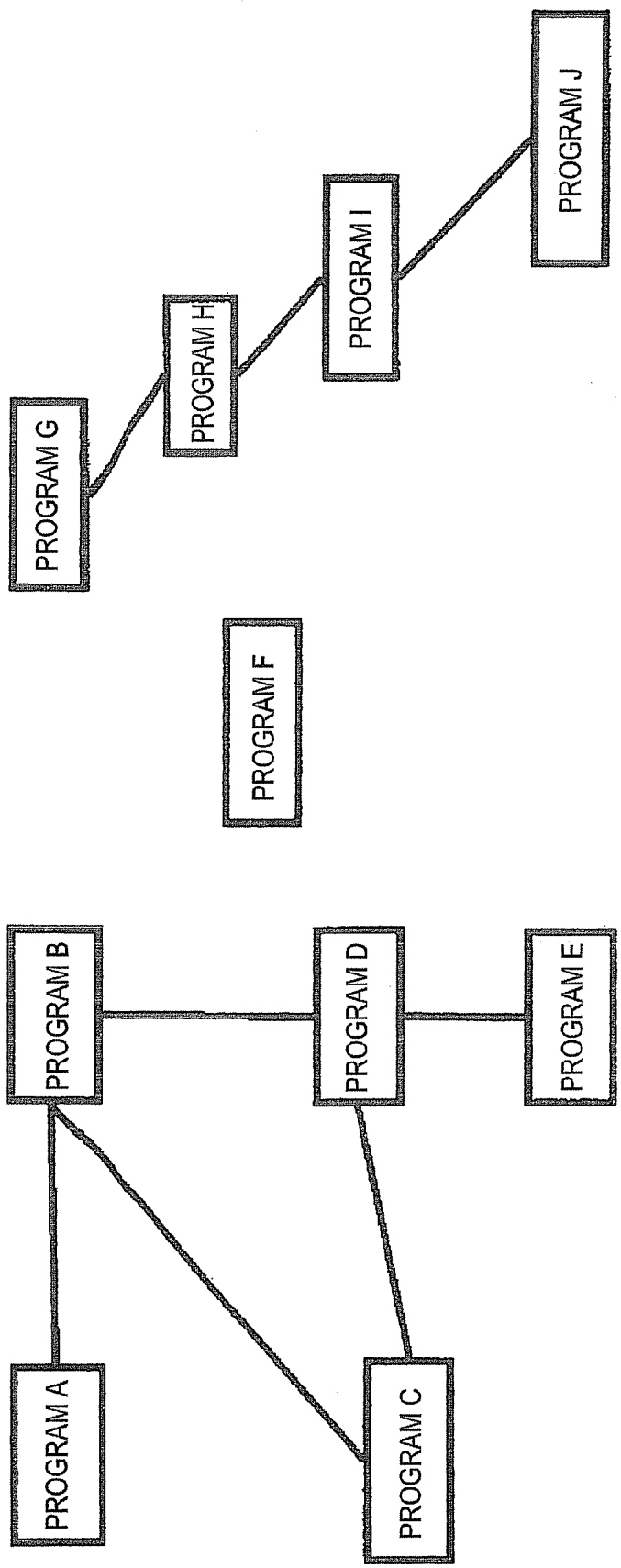
FIG. 8 is a diagram showing an example of a schedule conflicting network in a video recorder according to the first embodiment of the invention.

Next, modeling of conflict relationships of schedules by using a schedule conflicting network that becomes the base of this embodiment will be described with reference to FIGS. 7 and 8. FIG. 7 is an example in which record time periods of a plurality of scheduled programs are aligned along the time axis. FIG. 8 is an example in which the schedules shown in FIG. 7 are represented in a schedule conflicting network. In FIG. 8, each node of the network represents a scheduled program, and a case where two nodes are interconnected by a link (connection arc) represents that record time slots are partly overlapped between the schedules. For example, a program A and a program B have record time slots that are partly overlapped with each other, thus, the programs are interconnected through a link. However, a program F has a record time slot that is not directly overlapped with that of any other schedule, and thus, the program F is not connected to any other schedule through a link.

Figure 9:
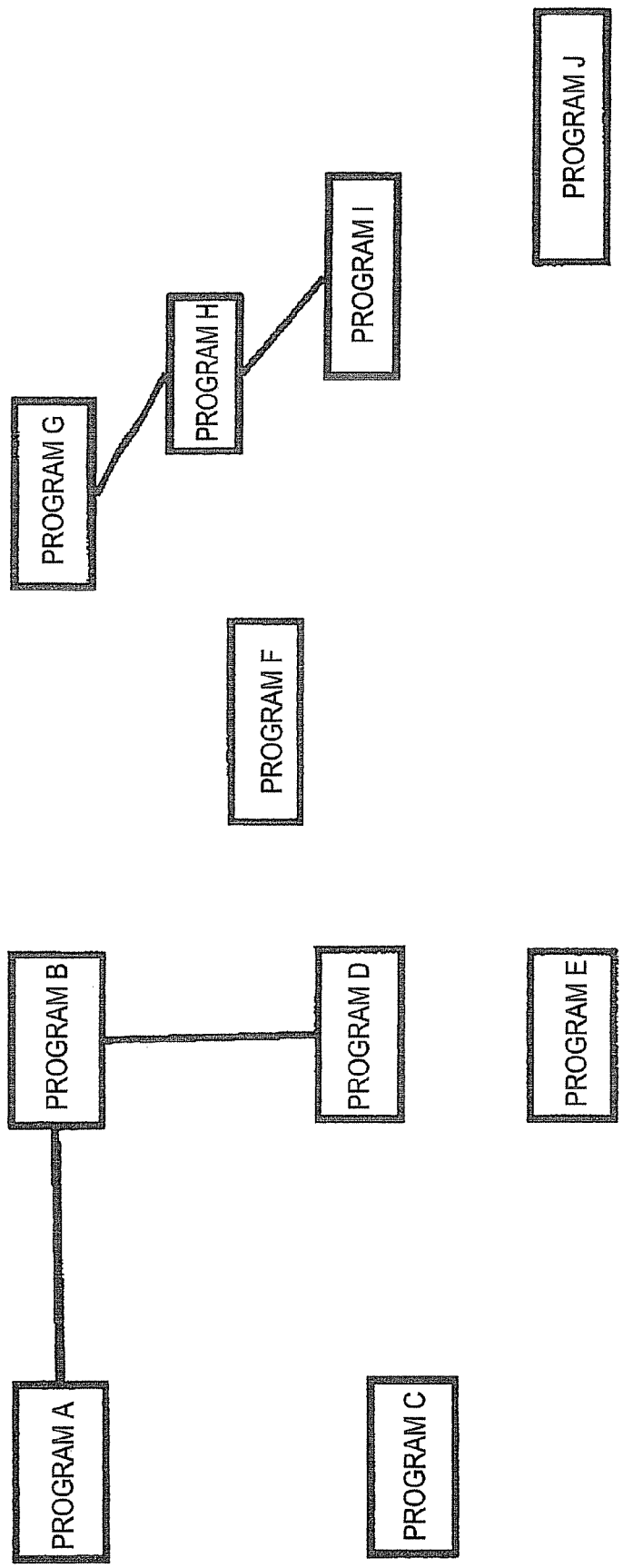
FIG. 9 is a diagram showing an example of a schedule conflicting network in a video recorder according to the invention, in a case where an exclusion relationship among recording resources is considered.

As another schedule conflicting network, there may be a case where only schedules of which record time periods are partly overlapped with one another and only any ones of recording resources that can be used have the exclusion relationship therebetween are connected to each other. FIG. 9 shows such an example. Here, according to the exclusion relationship shown in FIG. 5, the recording resource R5 for analog broadcast recording does not have an exclusion relationship with the recording resources R1 and R2 for digital broadcast. Thus, schedules of programs C, E, and J are not connected to the schedule for the digital broadcast. When there is a recording schedule, for which H.264 is designated by a user, among digital broadcast programs, the schedule uses the recording resources R3 and R4. Accordingly, there is an exclusion relationship between the resource R5 and the recording resources R3 and R4, and the recording resources are connected to one another in the schedule conflicting network.

Figure 10:
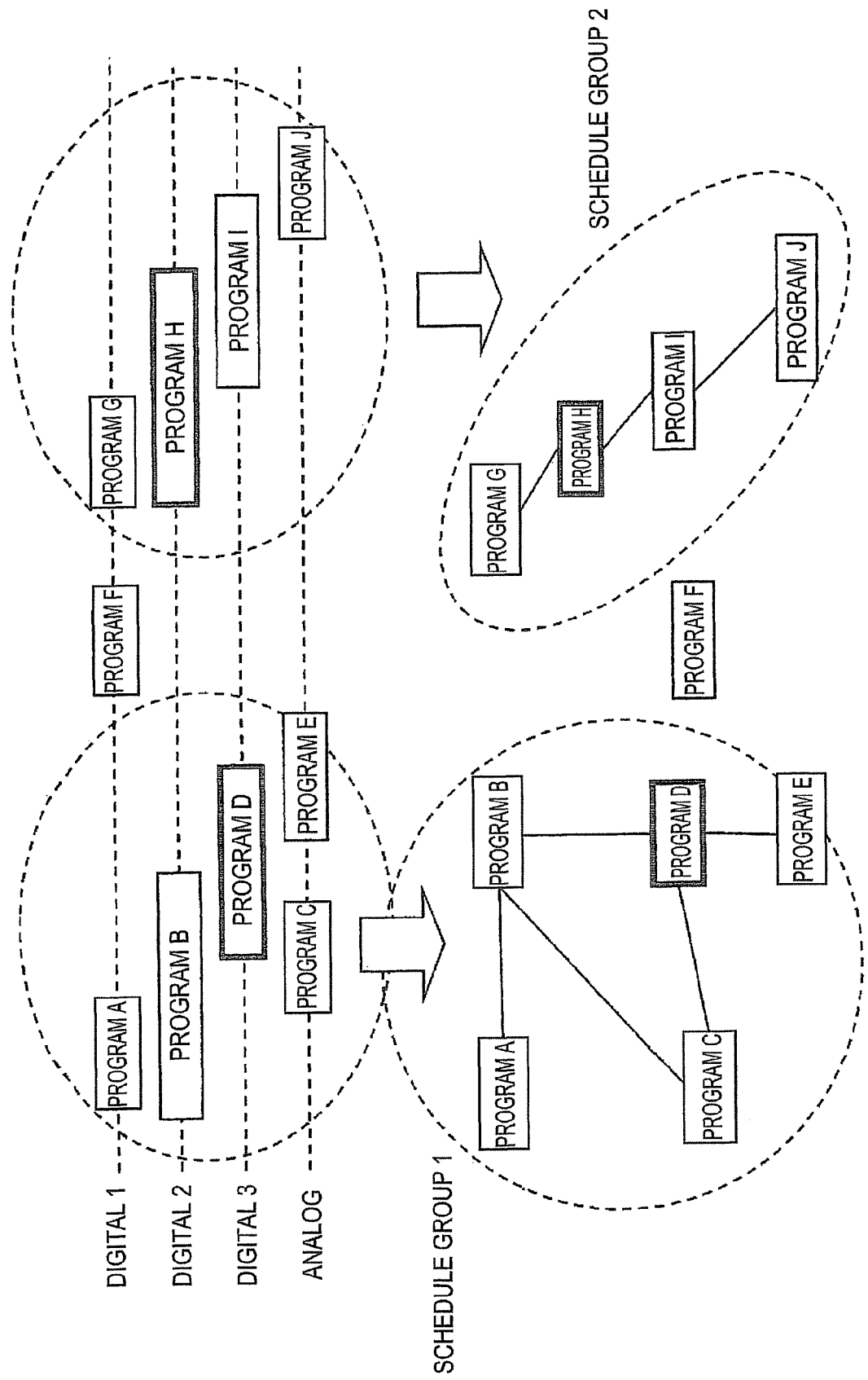
FIG. 10 is a diagram showing the function of a schedule group extracting module of a video recorder according to a first embodiment of the invention.

Next, the function of the schedule group extracting module 11 will be described with reference to FIG. 10. The schedule group extracting module 11 sets a recording schedule that is newly added, removed, or changed in time due to a change in broadcast time, program extension or the like as a base-node schedule and extracts a plurality of schedule groups that are connected to the base-node schedule on the schedule conflicting network as schedule groups having mutual influence on recording resource allocation to the base-node schedule to be targets for reallocation. For a schedule to be connected to the base-node schedule means that there exists a path from a node corresponding to the base-node schedule to the schedule on the network, and it cannot determined that the schedule has a time period directly overlapped with that of the base-node schedule. In the example shown in FIG. 7, when a program D (denoted by a thick frame) is set as the base-node schedule, as shown in FIG. 10, programs A, B, C, D, and E are extracted as a schedule group 1. On the other hand, when a program H is set as the base schedule, programs G, H, I, and J are extracted as a schedule group 2.

Figure 11:
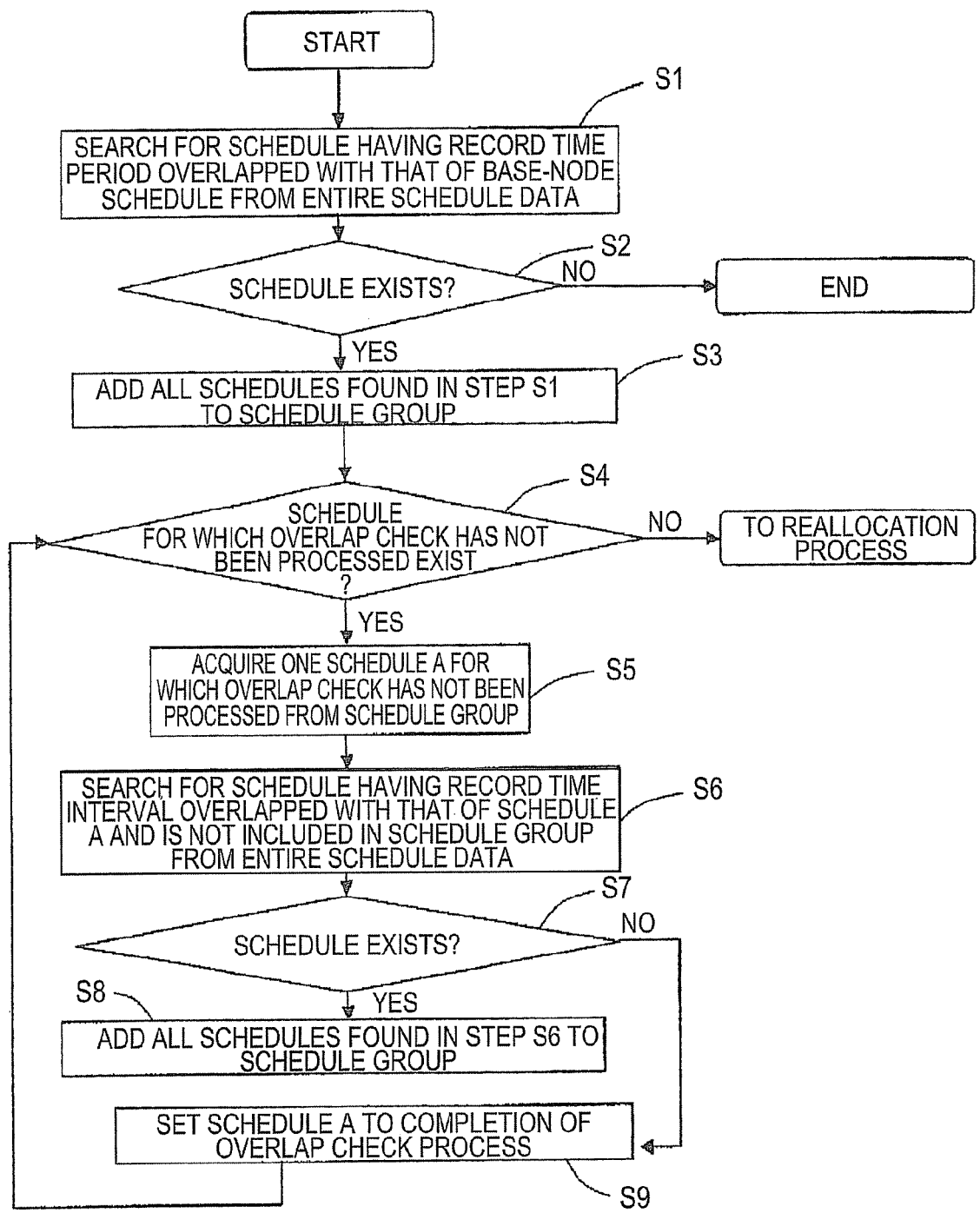
FIG. 11 is a schematic flowchart showing a process sequence of schedule group extracting module of a video recorder according to the first embodiment of the invention.

FIG. 11 schematically shows the process of the schedule group extracting module 11. First, the schedule group extracting module 11 searches for a schedule having a record time period overlapped with that of the base-node schedule from the entire schedule data (Step S1). When there is no overlapping schedule, the process ends (NO in Step S2). On the other hand, when there is an overlapping schedule (YES in Step S2), all the schedules found in Step S1 are added to the schedule group (Step S3). Here, when the base-node schedule is a newly added schedule or a time-changed schedule, the base-node schedule is also included in the schedule group. On the other hand, when the base-node schedule is a schedule to be removed, the base-node schedule is not included in the schedule group.

Steps S4 to S9 correspond to a process for searching for schedules that are not directly connected to the base-node schedule in a chained manner.

First, it is determined whether there is a schedule, for which overlap check has not been processed, in the schedule group. When there is no schedule for which the overlap check has not been processed (NO in Step S4), the process proceeds to a reallocation process for the schedule group. On the other hand, when there remains a schedule for which the overlap check has not been processed (YES in Step S4), one schedule A, for which the overlap check has not been processed, in the schedule group is acquired (Step S5), and a schedule that is overlapped in the record time period with the schedule A and is not included in the schedule group is searched for from the entire schedule data (Step S6). When there is such a schedule (YES in Step S7), all the schedules found in Step S6 are added to the schedule group (Step S8). Next, the schedule A is stored as a schedule for which the overlap check has been completed by setting a flag or the like (Step S9), and the process proceeds back to the process of Step S4.

In addition, there may be a case where schedules, which have overlapped record time periods, of which recording resources that can be used have a mutual exclusion relationship are searched for in the process of Steps S1 and S6. This corresponds to a case where only schedules of which recording resources that can be used have a mutual exclusion relationship are connected to each other, as the schedule conflicting network.

Figure 12:
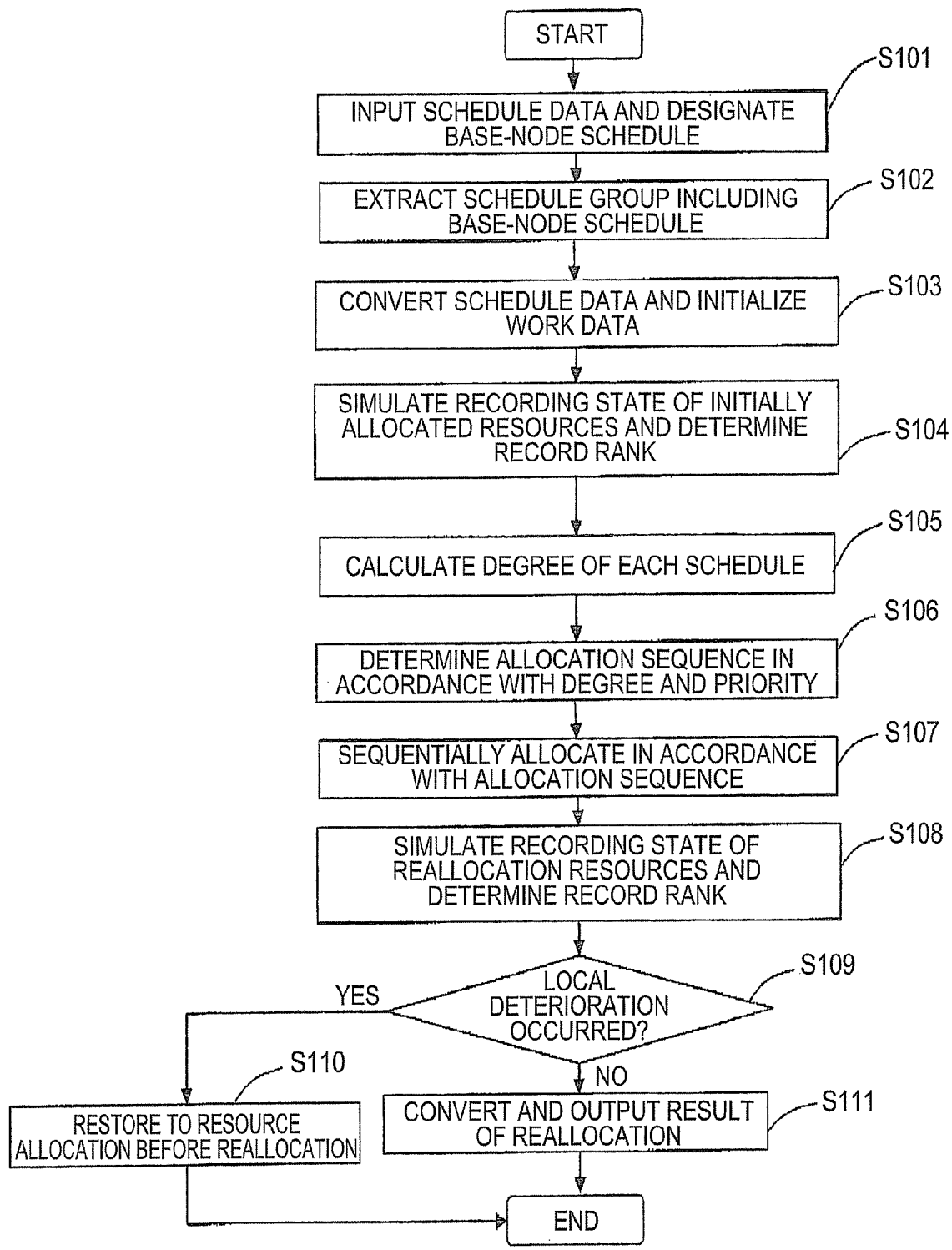
FIG. 12 is a schematic flowchart showing a process sequence of a video recorder according to the first embodiment of the invention.

Next, the entire process sequence of the resource allocation processing unit 1 according to the first embodiment will be described with reference to FIG. 12. FIG. 12 is an overview of the entire process sequence of the resource allocation processing unit 1. First, schedule registration data and a base-node schedule ID are input from the recording schedule managing unit 2 (Step S101), and the schedule group extracting module 11 extracts schedule groups including the base-node schedule (Step S102). In addition, the schedule data converting module 16 performs a schedule data conversion operation and a work data initializing operation (Step S103), if necessary.

Next, the local deterioration determining module 18 simulates a recording state and record rank determination for the extracted schedule group in a case where the initial allocated resources are used (Step S104). The simulation of the recording state and the record rank determination will be described later.

Next, the degree calculating module 12 performs a degree calculation operation for each schedule (Step S105) and the allocation sequence determining module 13 determines the allocation sequence based on the degree and the priority of the schedule (Step S106). Here, in a network, the number of links that come out of a node is referred to as the degree as a term of a graph theory. For example, in the example shown in FIG. 9, the degree of schedule of the program B or H is "2". Then, the sequential allocation module 14 performs a sequential allocation operation in accordance with the allocated sequence (Step S107), the local deterioration determining module 18 simulates a recording state and performs record rank determination for a case where the reallocated resource is used (Step S108) and determines whether local deterioration is generated (Step S109). The criteria of determination of the local deterioration will be described later. When the local deterioration is generated (YES in Step S109), the initial recording resources before the reallocation are restored (Step S110). Otherwise, when the result of reallocation is needed, the schedule data converting module 16 converts the result of the reallocation and outputs the converted result to the recording schedule managing unit 2 (Step S111).

Here, the simulation of the recording state represents simulating the result of an actual recording state of each schedule at a time when the record control module 31 shown in FIG. 1 is to perform a record operation by using the allocated recording resources. For example, when the record control module 31 determines superiority of the priorities of a schedule and a resource-conflicting schedule at a time when the schedule is initiated, it is assumed that the schedule having higher priority is initiated. In addition, it is assumed that the rule of a schedule initiated later is followed in a case where the priorities are the same. In the example shown in FIG. 13, when all the schedules are allocated to a same recording resource, a hashed part cannot be recorded. For example, in Example 1, the schedule A is stopped by initiating record for schedule B having the same priority as that of the schedule A. In addition, schedule C has the priority lower than that of the schedule B, and thus, the schedule C cannot be initiated and fails to be recorded. In addition, in Example 2, the schedule B has the priority lower than that of the schedule A and thus, is not initiated to fail to be recorded. As a result, schedule C succeeds to be recorded. By simulating the operation of the record control module 31, as described above, as a result of mutual influences of a plurality of schedules, a part that cannot be recorded is predicted based on the simulation of the recording state. In addition, the operation specification of the record control module 31 according to the invention is not limited to these examples. For example, various operation specifications such as a specification in which a later schedule B is not recorded in the disposition of Example 1 shown in FIG. 13 or a specification in which a latter half part can be recorded for a case where a lead part of the schedule C cannot be recorded may be used.

The record rank is classification of the recording state of each of the schedules into the following stages.

Figure 13:
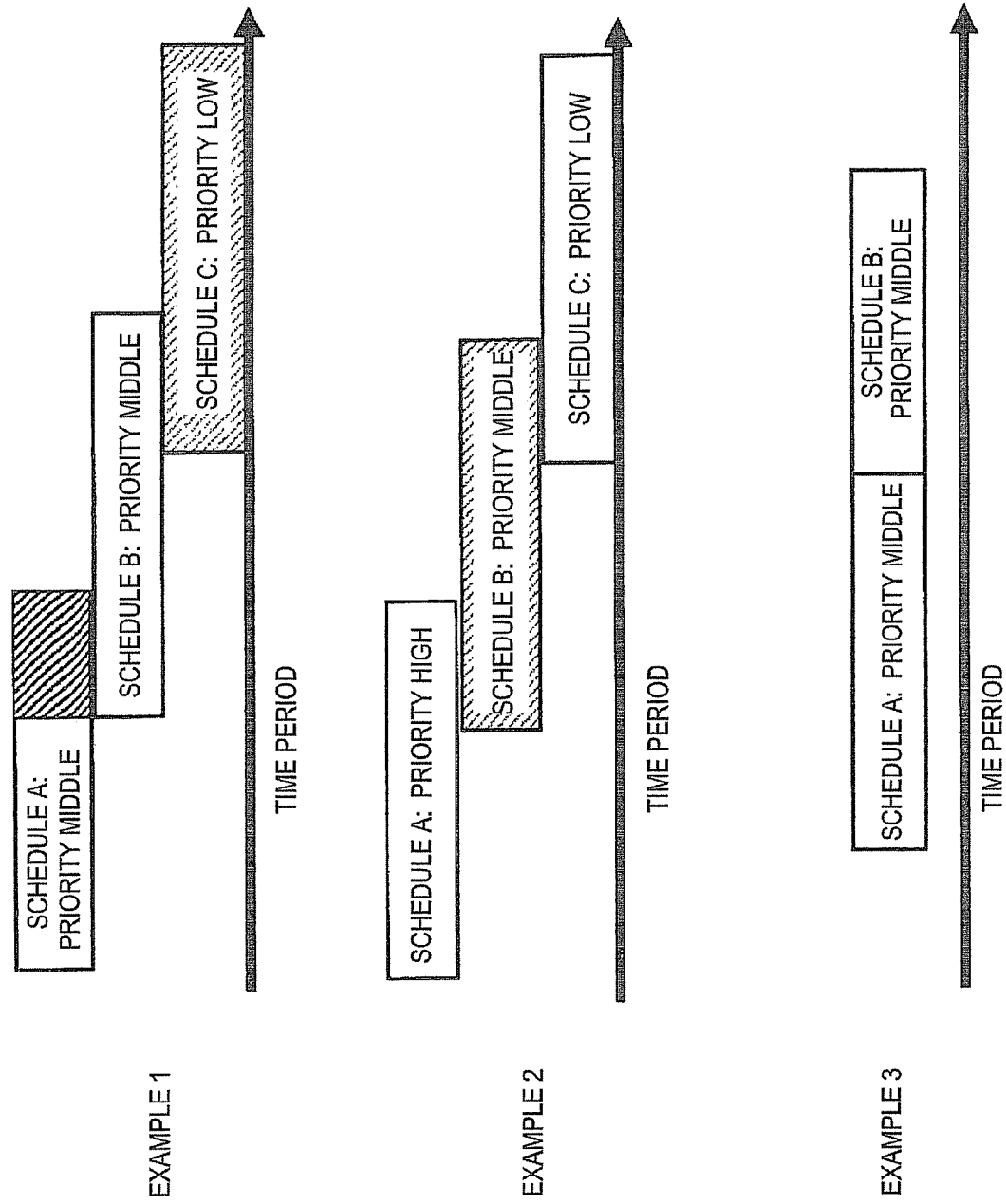
FIG. 13 is a diagram for describing a record simulation and rank determination of a video recorder according to the first embodiment of the invention.

1. completely recordable
2. adjacent to other schedule
3. partly recordable
4. unrecordable In the video recorder according to the first embodiment, any one of the stages may be omitted. For example, in the Example 1 shown in FIG. 13, the schedule A is partly recordable, the schedule B is completely recordable, and the schedule C is unrecordable. Here, to be adjacent represents a state in which the end time of a schedule and the start time of another schedule coincide with each other or a state in which the start time of a schedule and the end time of another schedule coincides with each other. In such a case, there is a case where a part that cannot be recordable due to generation of a time leg in a schedule switching process is generated. For example, the Example 3 of FIG. 13 shows a case where the schedule A is adjacent to the schedule B, and thus, the end part of the schedule A cannot be recorded.

Next, the criteria of local deterioration which is used by the local deterioration determining module 18 will be described. There are three types of the criteria of determining whether the recording state is locally deteriorated. Here, the deterioration of the record rank means that the record rank changes from "completely recordable" to "partly recordable", from partly recordable to unrecordable, or the like. It may be defined that changes between only a part of the record ranks are determined to be improved or deteriorated.

(1) When a schedule of which record rank is deteriorated is generated, "local deterioration" is determined.

(2) When the priority of a schedule which has the highest priority among schedules of which record ranks are improved is equal to or lower than the priority of a schedule of which record rank is deteriorated, "local deterioration" is determined.

(3) When the priority of a schedule which has the highest priority among schedules of which record ranks are improved is equal to or lower than any one of priorities of competitive schedules that are equal to or lower than a schedule of which resource allocation is changed among a schedule group that is newly completing with the schedule of which resource allocation is changed, "local deterioration" is determined.

The determination criterion (1) does not allow all the schedules to have deterioration of record ranks.

Figure 14:
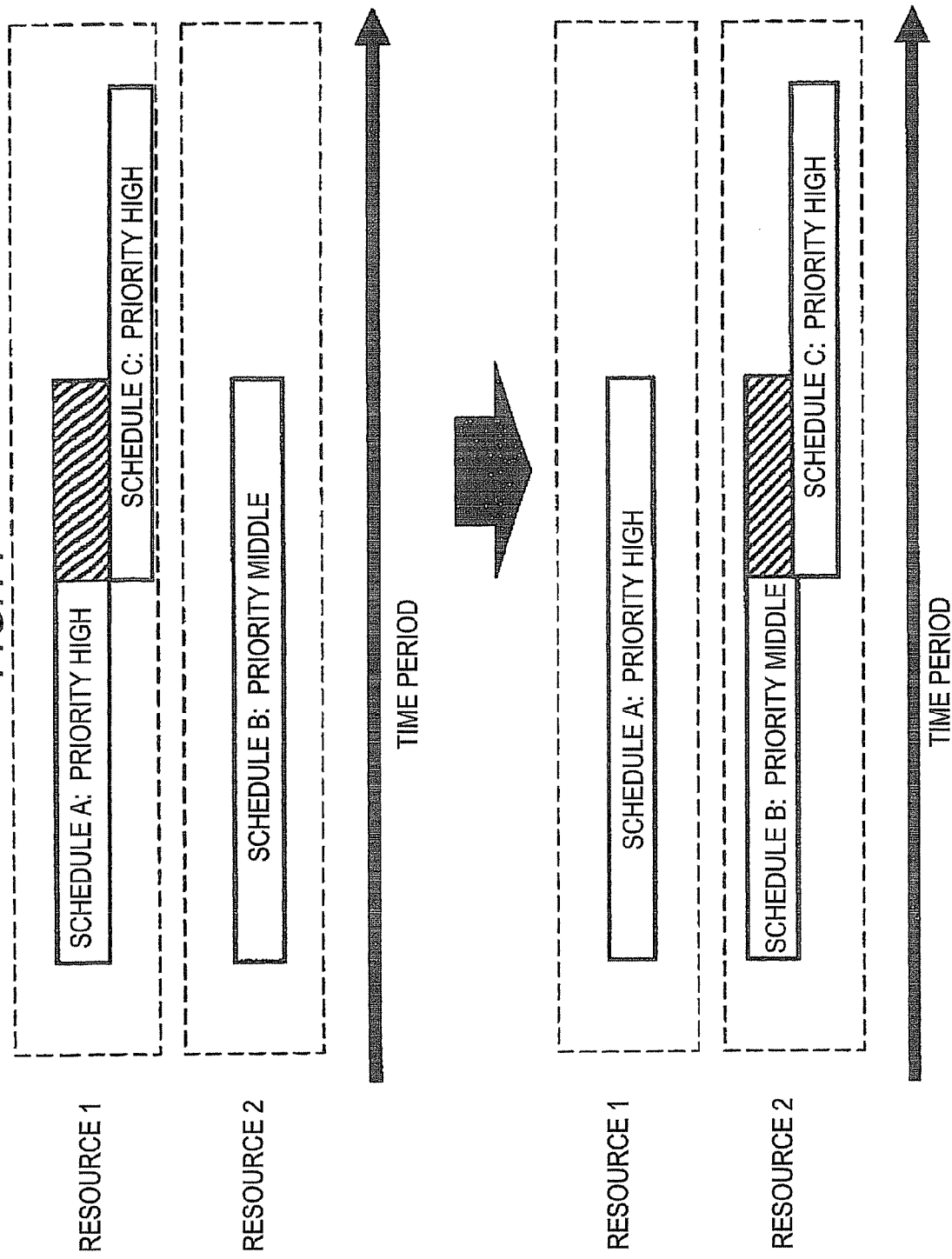
FIG. 14 is a diagram for describing a determination criterion of local deterioration of a recording state according to the first embodiment of the invention.

The determination criterion (2) is based on a consideration that generation of deterioration of the record rank due to new record missing or adjacency is not allowed at all in the automatic allocation for a schedule having the highest priority, and in order to improve the record rank of a schedule having a relatively high record rank, a schedule having a relatively low priority is sacrificed to be lowered in the record rank is allowed by a user. Hereinafter, an example shown in FIG. 14 will be described. In FIG. 14, when it is assumed that the state shown on the upper link is disposition before reallocation and the state shown on the lower link is the state after reallocation, by changing the allocation of the schedule C from a resource 1 to a resource 2, a schedule B is deteriorated to the record rank of "partly recordable". However, the record rank of a schedule A that has a higher priority is improved to "completely recordable", the local deterioration is not generated based on the determination criterion (2). On the other hand, when the priority of the schedule A is the same as that of the schedule B, the local deterioration is regarded to be generated.

In addition, in the example shown in FIG. 14, it is determined that the local deterioration is generated based on the criterion (1).

The determination criterion (3), which is the most conservative criterion, is based on a consideration that when a schedule that becomes a cause (a conflicting counterpart of a recording resource) of unrecordability is changed in allocation by an automatic allocation, even if the schedule cannot be made before the reallocation, the reallocation is taken to be the reason for unrecordability and the degree of satisfaction of a user decreases.

Figure 15:
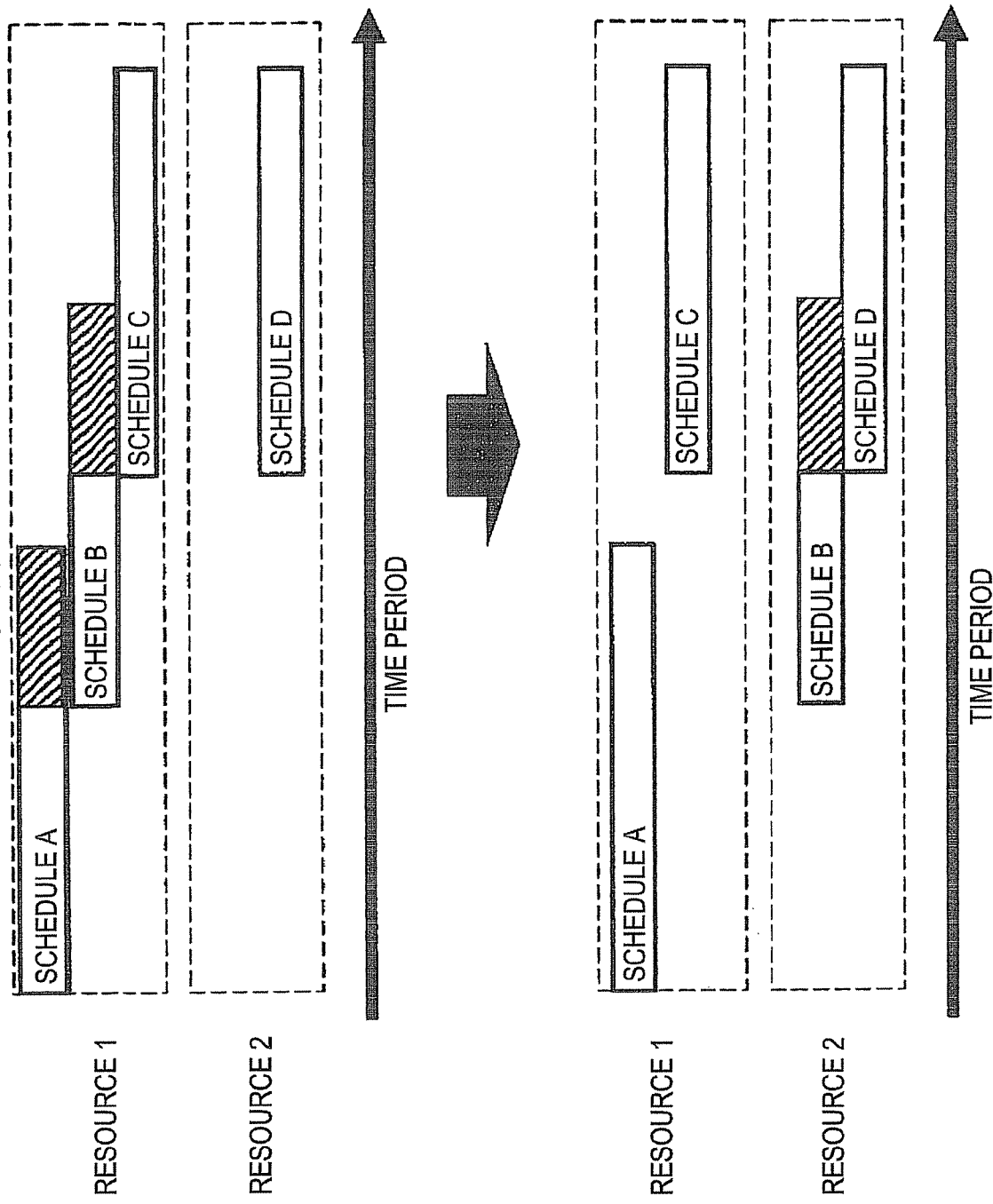
FIG. 15 is a diagram for describing a determination criterion of local deterioration of a recording state according to the first embodiment of the invention.

Hereinafter, an example shown in FIG. 15 will be described. It is assumed that the priorities of schedules shown in FIG. 15 are the same and a schedule A is already initiated and is fixed to the resource 1. When it is assumed that the state shown on the upper link is disposition before reallocation and the state shown on the lower link is the state after reallocation, by changing the allocation of a schedule B from the resource 1 to a resource 2, the schedule A has an improved record rank of "completely recordable". In addition, among schedules (in this example, only a schedule D) that newly conflicts with the schedule B for which allocation is changed, a conflicting schedule (in this example, the schedule D) that has a priority equal to or lower than that of the schedule B has a same priority as that of the schedule B, that is, the record rank of the schedule B does not change. However, the conflicting counterpart of the recording resource is changed from a schedule C to the schedule D. As a result, it is regarded that local deterioration is generated based on the determination criterion (3). The reason for selecting the priority that is equal to or lower than that of the schedule, for which the resource allocation is changed, among the schedule group that newly conflicts with the changed schedule is that a schedule having a priority higher than that of the changed schedule is not dropped out from a record process due to the changed schedule.

In addition, for the example shown in FIG. 15, local deterioration is determined not to be generated based on the criterion (1) or the criterion (2).

Next, the processes of Step S106 and Step S107 shown in FIG. 12 will be described in detail with reference to FIG. 16. Steps S201 to S212 are detailed steps of the allocation sequence determining process of Step S106. First, from the schedule group, a schedule A that has the degree smaller than the number of resource candidates that can be used and is not treated as a removed schedule on the network is searched for (Step S201). Here, to a schedule having the degree smaller than the number of resource candidates that can be used, resource allocation can be made all the time even when arbitrary resources are assigned to other connected schedules. Accordingly, to change the sequence for allocation backward to the schedule increases a possibility that allocation of the resources to the entire schedule group succeeds.

When there is no schedule A having the degree smaller than the number of resource candidates that can be used (NO in Step S202), the process proceeds to a process of Step S207. On the other hand, when there is the schedule A (YES in Step S202), one schedule B, of which degree is not updated, connected to the schedule A is searched for (Step S203). When there is the schedule B (YES in Step S204), the degree of the schedule B is decreased by a weight of a combination of the resource patterns of schedules A and B, and completion of update of the degree is set (Step S205). On the other hand, when there is no schedule B (NO in Step S204), the schedule A is treated to be removed from the network and is piled in a stack (Step S206), and then, the process proceeds back to Step S201.

Here, a weight of a combination of a resource pattern in a degree calculating process will be described later in detail. In addition, treating a schedule to be removed from the network is implemented by setting a flag that can be identifiable to be excluded from the schedule conflicting network and is not erasing information on the network connection. In addition, the stack is temporary memory means having a FILO (first in last out) configuration, and any other means may be used as long as a schedule ID can be extracted from it in a reverse order from the order of storing in a process after Step S213.

Next, when all the schedules of the schedule group are treated to be removed from the network (YES in Step S207), the process proceeds to a process of Step S213. Otherwise (NO in Step S207), one schedule C that is a schedule treated not to be removed from the network and has the lowest priority is searched for (Step S208). Then, one schedule D that is connected to the schedule C and has the degree, which is not updated, is searched for (Step S209). When there is the schedule D (YES in Step S210), the degree of the schedule D is decreased by a weight of the combination of resource patterns of schedules C and D, completion of update of the degree of the schedule D is set, and the process proceeds back to the process of Step S209 (Step S211). On the other hand, when there is no schedule D (NO in Step S210), the schedule C is treated to be removed from the network and is piled in the stack, and then, the process proceeds back to the process of Step S201 (Step S212).

Steps S213 to S215 are detailed steps of the sequential allocation process of Step S107. When the stack is empty (YES in Step S213), it is determined that the whole reallocation process is completed, and the process ends. On the other hand, when the stack is not empty (NO in Step S213), one schedule E is extracted from the beginning of the stack, and the schedule is treated to be restored on the network (Step S214).

Then, among the schedules treated to be restored on the network, an allocation-completed schedule that is connected to the schedule E is found, and a recording resource that does not conflict (not in the conflict relationship) with the allocation-completed schedule is allocated. When there is no resource that is unoccupied, and it is determined that allocation cannot be made, an allocation failure flag is set, and resources allocated before reallocation are allocated as a default value. If schedule information includes information on the recording resource that is desired from a user, when a recording resource that is desired from the user can be allocated in the process of Step S215, the recording resource may be reallocated preferentially. Thereafter, the process returns back to the process of Step S213 (Step S215).

Figure 16:
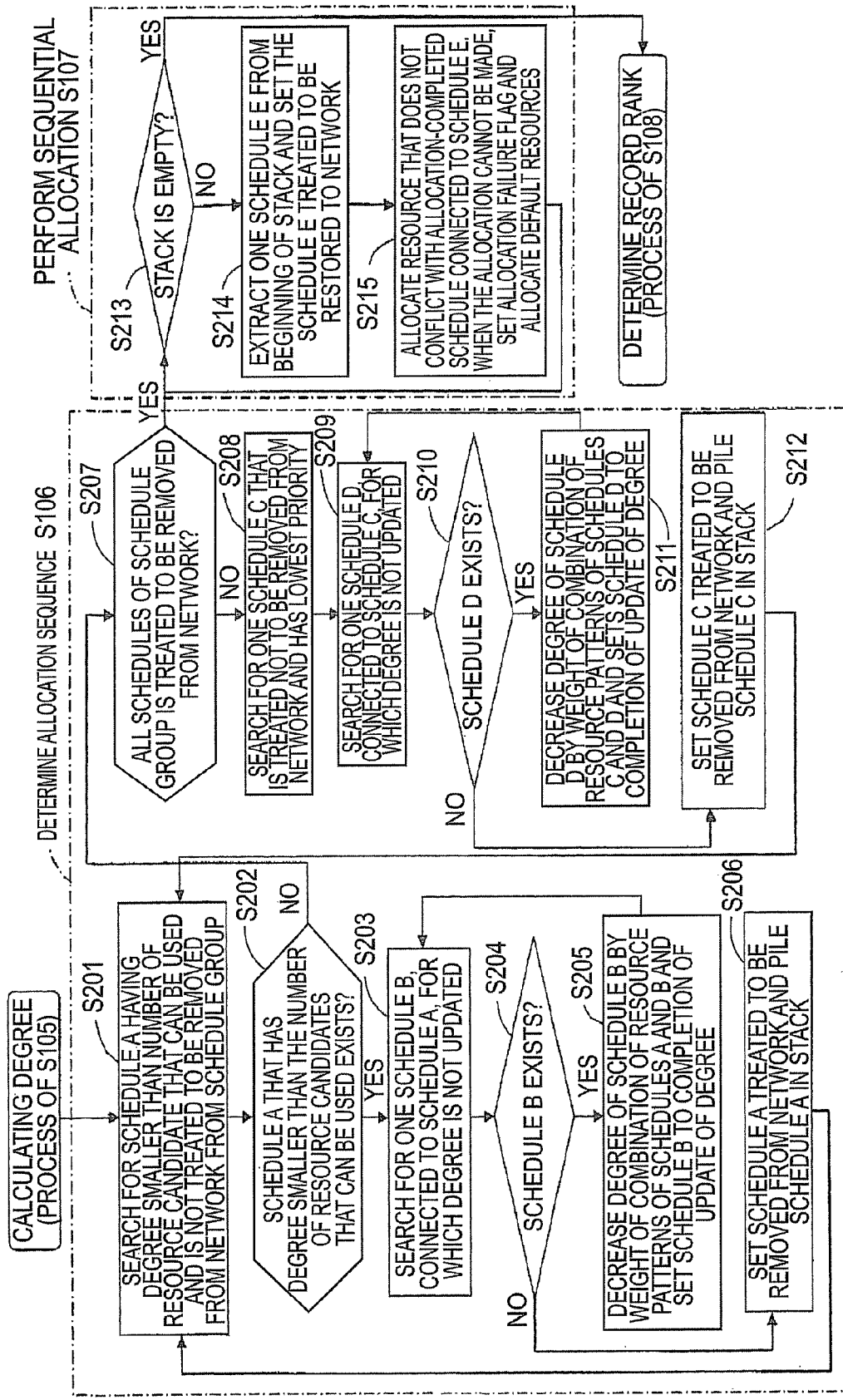
FIG. 16 is a flowchart showing an allocation sequence determining step and a sequential allocation step shown in FIG. 12.
Figure 17:
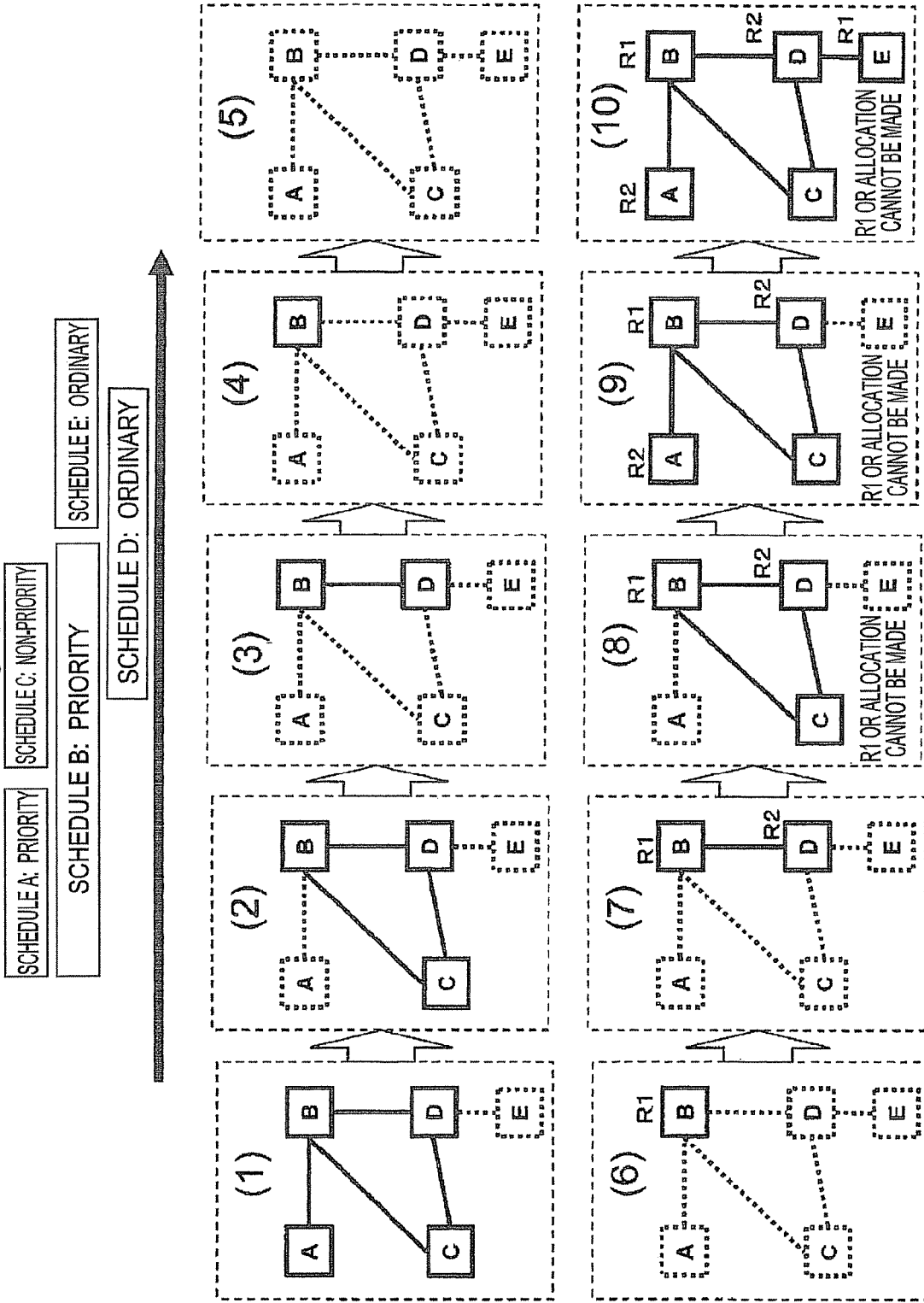
FIG. 17 is a diagram showing an example of recording resource allocation of a video recorder according to the first embodiment of the invention.

FIG. 17 schematically shows an example of the process shown in FIG. 16. Here, five schedules A, B, C, D, and E are extracted as a schedule group and become targets for reallocation. Here, it is assumed that the schedules A and B have the highest priority, the schedules D and E has an ordinary priority, and the schedule C has the lowest priority. In the figure, "(1)" to "(5)" correspond to the allocation sequence determining process of Step S106, and "(6)" to "(10)" correspond to the sequential allocation process of Step S107. In each schedule conflicting network, it is assumed that a schedule enclosed by a dotted rectangle is treated to be removed from the network.

Second Embodiment

In a second embodiment, the system configuration and basic functions are almost the same as those of the first embodiment. However, in the second embodiment, the local deterioration determining operation and the allocation restoring operation are simultaneously performed at a time when sequential reallocation of resources to the schedules is determined, which is different from the first embodiment.

Figure 18:
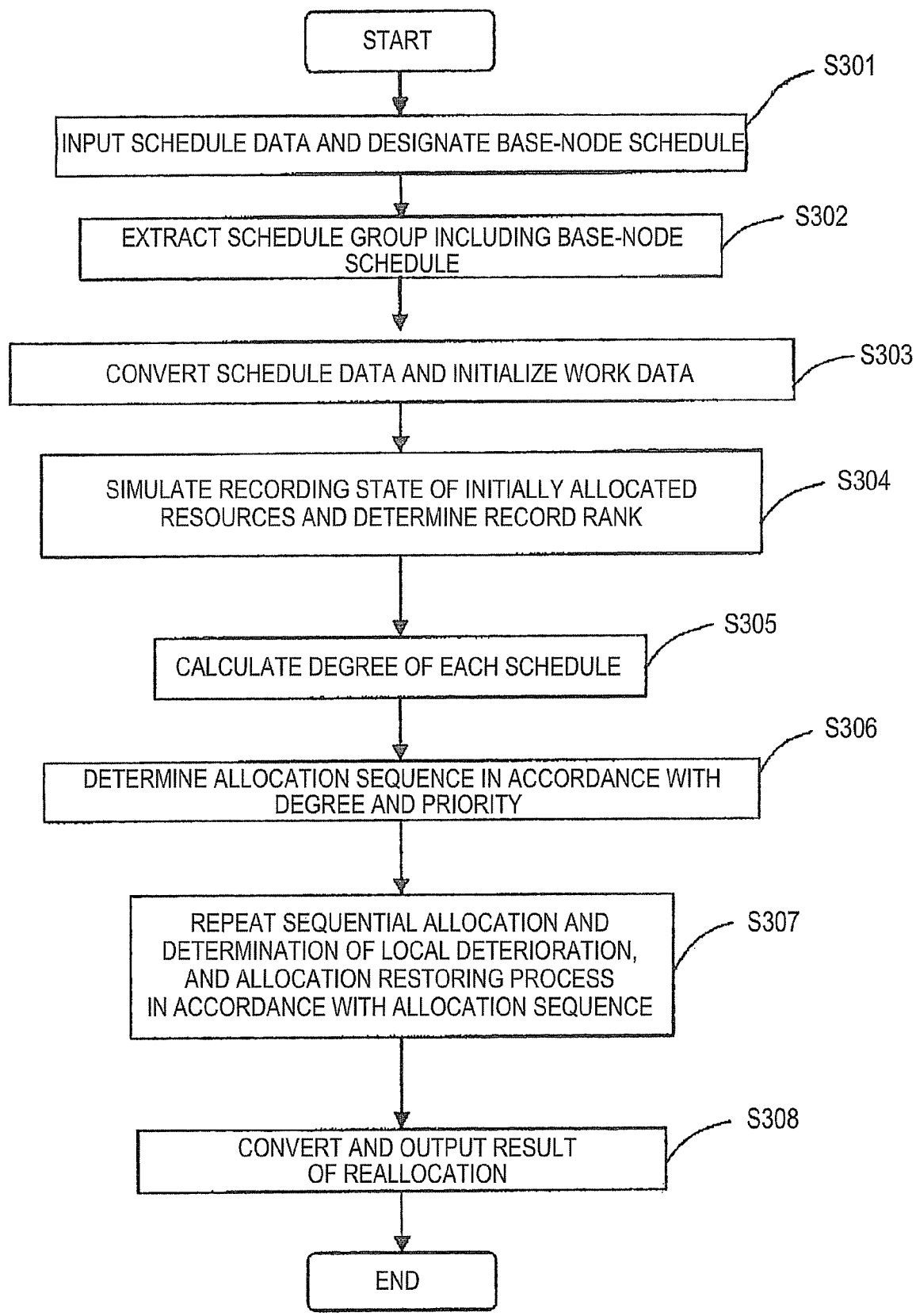
FIG. 18 is a schematic flowchart showing a process sequence of a video recorder according to a second embodiment of the invention.

The whole process sequence of the resource allocation processing unit 1 according to the second embodiment will be described for a case where the local deterioration determination criterion (2) is used, with reference to FIGS. 18 and 19. In FIG. 18, Steps S301 to S306 are the same as the processes of Steps S101 to S106 shown in FIG. 12. In Step S307, when the sequential reallocation of the resources to the schedules is determined, the above-described local deterioration determination is performed simultaneously. When it is determined that there is the local deterioration, first, all the reallocated schedules are returned to the resource allocation before reallocation by using the allocation restoring module 19.

Figure 19:
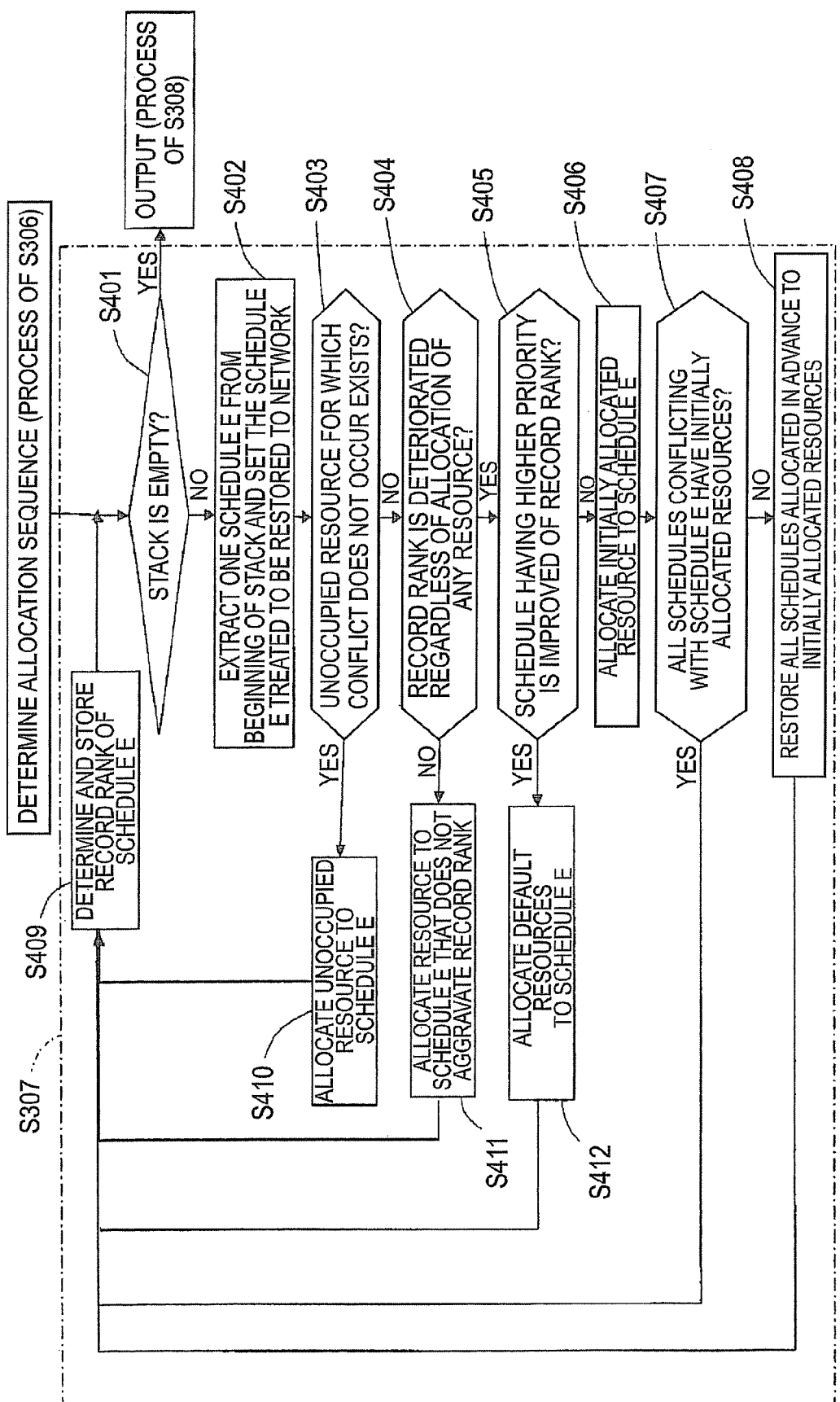
FIG. 19 is a flowchart showing the detailed process sequence of Step S307 in the process sequence shown in FIG. 18.

FIG. 19 shows details of the process of Step S307 shown in FIG. 18. First, when the stack in which schedules are stored in the order of determination of allocation in Step S306 is empty (YES in Step S401), it is determined that the whole reallocation process is completed, and the process proceeds to Step S308 shown in FIG. 18. On the other hand, when the stack is not empty (NO in Step S401) one schedule E is extracted from the beginning of the stack and is treated to be restored on the network (Step S402).

Next, schedules that are directly overlapped with the schedule E in the time period and have recording resources that have a possibility of conflict, which is, recording resources that are allocated to the reallocation-completed schedules that are connected on the network are checked, and it is determined whether there is an unoccupied resource. When there is the unoccupied resource (YES in Step S403), the unoccupied resource is allocated to the schedule E (Step S410), the record rank of the schedule E is determined and stored (Step S409), and the process proceeds back to Step S401.

On the other hand, when there is no unoccupied resource (NO in Step S403), it is determined whether the record rank is deteriorated regardless of allocation of a resource to the schedule E. When there is allocation for not aggravating the record rank (NO in Step 404), the resource that does not aggravate the record rank is allocated to the schedule E (Step S411), the record rank of the schedule E is determined and stored (Step S409), and then, the process proceeds back to Step S401.

On the other hand, when there is no allocation for not aggravating the record rank (YES in Step S404), it is determined whether there is an improved record rank for a schedule, which has the priority higher than that of the schedule E, among the allocation-completed schedules. When there is the schedule, the local deterioration is determined not to be generated (YES in Step S405), a default resource such as a resource desired from the user is allocated to the schedule E (Step S412), the record rank of the schedule E is determined and stored (Step S409), and then, the process proceeds back to Step S401.

On the other hand, when there is no improved record rank for a schedule, which has the priority higher than that of the schedule E, among the allocation-completed schedules (NO in Step S405), the local deterioration is determined, and the resource of the initial allocation is allocated to the schedule E (Step S406). When the initial resources are allocated to all the schedules conflicting with the schedule E, that is, when the initially allocated resources are allocated to all the schedules connected on the network (YES in Step S407), the reallocation-completed schedules are not needed to be modified. Thus, the record rank of the schedule E is determined and stored (Step 409), and the process returns to Step S401. Otherwise (NO in Step S407), a process for restoring the allocation of all the schedules to the initially allocated resources is performed (Step S408), the record rank of the schedule E is determined and stored (Step S409), and the process returns to Step S401.

In addition, for a case where the local deterioration determining criterion (1) is used, a process flow acquired from removing Steps S405 and S412 in FIG. 19 is used. On the other hand, for a case where the local deterioration determining criterion (3) is used, a process flow acquired from removing Steps S404 and S411 in FIG. 19 is used.

Third Embodiment

In a third embodiment, the system configuration and basic functions are almost the same as those of the first embodiment. However, according to the third embodiment, a schedule in which the local deterioration is generated is found after determination of reallocation of resources to the schedules are performed, and schedules that directly conflicting with the locally deteriorated schedule in resources are changed in allocation of resources, all the locally-deteriorated schedules are restored to the resource allocation before the reallocation by recursively repeating restoring to the original resource allocation, which is different from the first embodiment.

Figure 20:
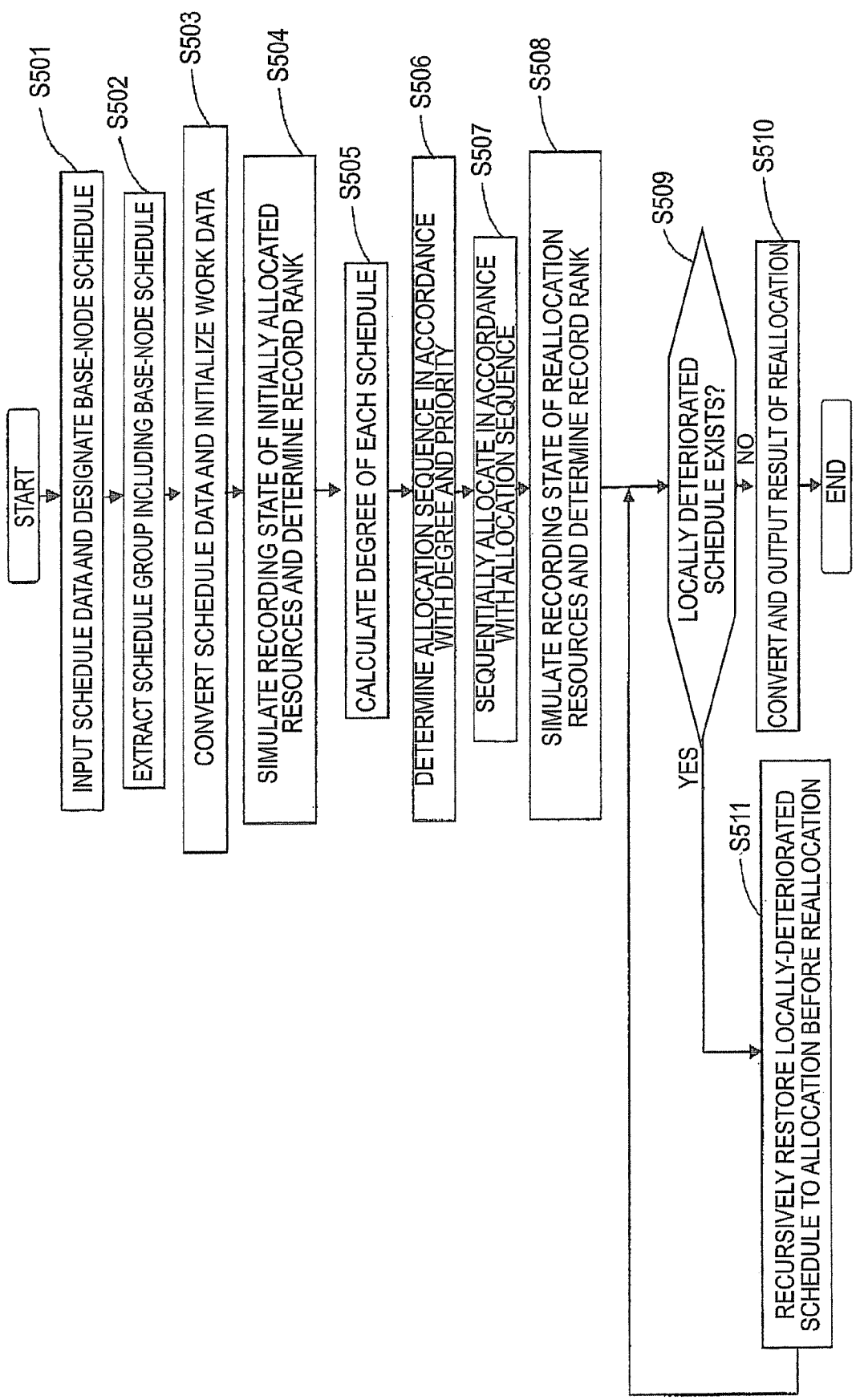
FIG. 20 is a schematic flowchart showing a process sequence of a video recorder according to a third embodiment of the invention.

The whole process sequence of the resource allocation processing unit 1 according to the third embodiment will be described for a case where the local deterioration determination criterion (2) is used, with reference to FIGS. 20 and 21. In FIG. 20, Steps S501 to S508 are the same as the processes of Steps S101 to S108 shown in FIG. 12. In Step S509, it is determined where there is a schedule for which the process of Step S511 has not been performed among the locally deteriorated schedules. When there is the schedule for which the process of Step S511 has not been performed (YES in Step S509), a recursive repeating process for restoring the locally deteriorated schedule to the resources before the reallocation and restoring all the schedules under the influence of the locally deteriorated schedule to the resources before the reallocation are performed (Step S511). On the other hand, when there is no schedule for which the process of Step S511 has not been performed among the locally deteriorated schedules (NO in Step S509), the result of reallocation is converted as is needed and is output (Step S510).

Figure 21:
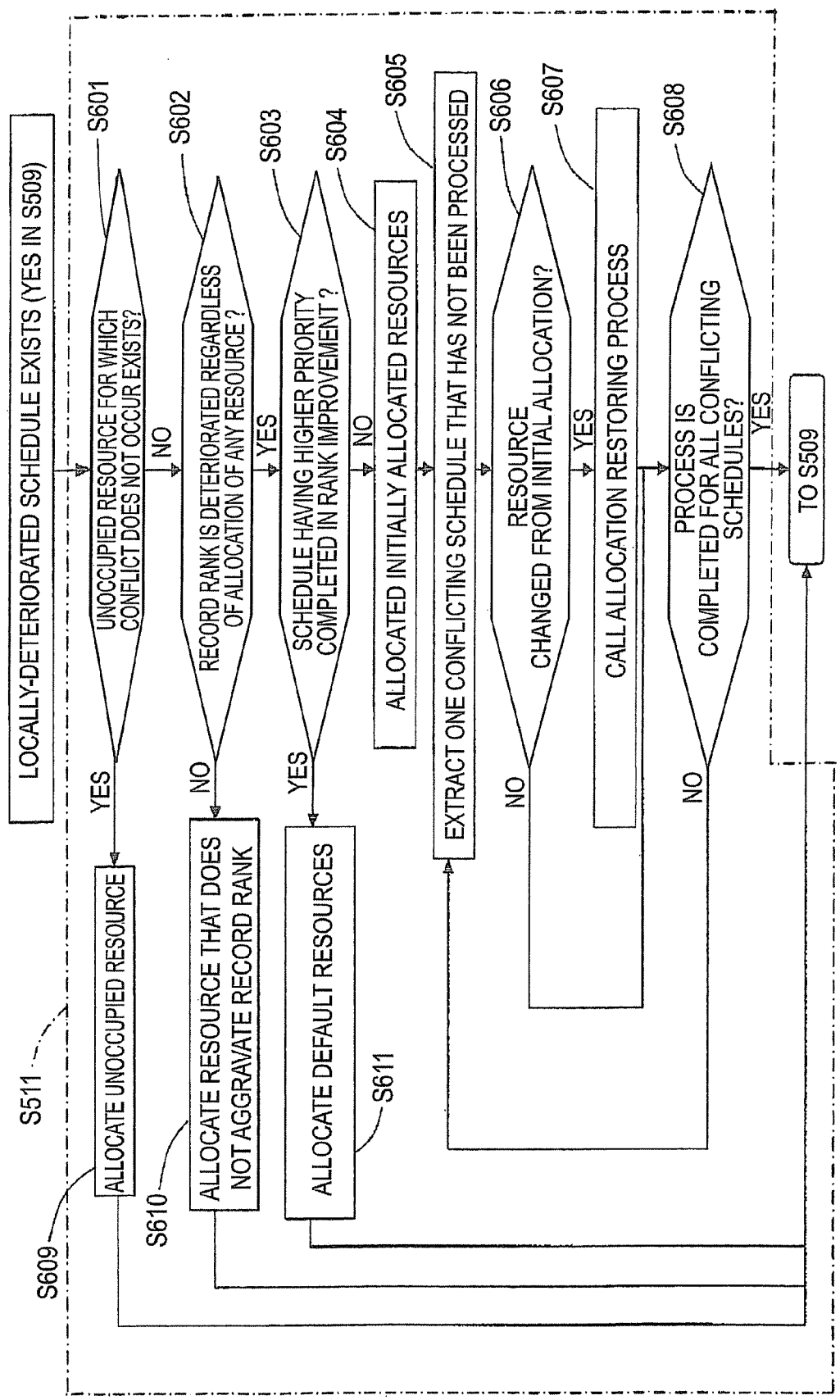
FIG. 21 is a flowchart showing the detailed process sequence of Step S511 in the process sequence shown in FIG. 20.

FIG. 21 shows details of the process of Step S511 shown in FIG. 20. This process has a structure for calling a process recursively. First, schedules that are directly overlapped with a target schedule in the time period and have recording resources having a possibility of conflict, which is, recording resources that are allocated to the reallocation-completed schedules that are connected on the network are checked, and it is determined whether there is an unoccupied resource that can be used. When there is the unoccupied resource (YES in Step S601), the unoccupied resource is allocated to the schedule (Step S609), and the process proceeds back to Step S509.

On the other hand, when there is no unoccupied resource (NO in Step S601), it is determined whether the record rank is deteriorated regardless of allocation of a resource to the target schedule. When there is allocation for not aggravating the record rank of the target schedule and all the schedules conflicting with the target schedule (NO in Step 602), the resource that does not aggravate the record rank is allocated to the schedule (Step S610), and then, the process proceeds back to Step S509.

On the other hand, when there is no allocation for not aggravating the record rank (YES in Step S602), it is determined whether there is an improved record rank for a schedule, which has the priority higher than that of the target schedule, among the allocation-completed schedules. When there is the schedule, the local deterioration is determined not to be generated (YES in Step S603), a default resource such as a resource desired from the user is allocated to the schedule (Step S611), and then, the process proceeds back to Step S509.

On the other hand, when there is no improved record rank for a schedule, which has the priority higher than that of the target schedule, among the allocation-completed schedules (NO in Step S603), the resources of the initial allocation are allocated to the schedule (Step S604), and a non-processed schedule is extracted from the schedules conflicting with the target schedule (Step S605). When the extracted conflicting schedule is changed in the allocation of resources from the initially allocated resources (YES in Step S606), the conflicting schedule is set as the target schedule, and the process shown in FIG. 21 is recursively called. When the extracted conflicting schedule has the initially allocated resources (NO in Step S606), it is determined whether the process of Step S606 has been performed for all the conflicting schedules. When the process for all the conflicting schedules is completed (YES in Step S608), the process is returned to Step S509. On the other hand, when the process is not completed (NO in Step S608), the process is returned to the process of S605.

In addition, for a case where the local deterioration determining criterion (1) is used, a process flow acquired from removing Steps S603 and S611 in FIG. 21 is used. On the other hand, for a case where the local deterioration determining criterion (3) is used, a process flow acquired from removing Steps S602 and S610 in FIG. 21 is used.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from the configurations described as the embodiments. Further, the components described in different embodiments may be used appropriately in combination.

What is claimed is:

1. A video recorder comprising:
a schedule input section that is configured to register a plurality of schedules for performing programmed recordings to record desired programs;
a program recording section that performs the programmed recordings in accordance with the schedules registered by the schedule input section; and
a schedule reconfiguration section that reconfigures the schedules by:
determining an occurrence of a conflict when both of first and second conditions are satisfied, wherein the first condition is satisfied when a first time slot in which a first program included in a given schedule included in the schedules is to be broadcasted and a second time slot in which a second program included in other schedule included in the schedules is to be broadcasted overlap with each other, and wherein the second condition is satisfied when a first resource that is to be used for recording the first program and a second resource that is to be used for recording the second program overlap with each other; and
concurrently performing, when the conflict is determined, a reallocation of resources to be used for performing the programmed recordings for the schedules that are affected by a resource allocated to be used for performing the programmed recording for the first schedule based on information representing exclusion relationships between the first schedule and the second schedule,
wherein the schedule reconfiguration section comprises:
a local deterioration determining module that determines whether a local deterioration in a recording state occurs by performing simulating the recording state obtained when the reallocated resources are used for performing the programmed recordings and comparing the simulated recording state with a recording state obtained when the resources before the reallocation is used for performing the programmed recordings; and
an allocation restoring module that restores the reallocated resources at a part causing the local deterioration to the resources allocated before the reallocation when the local deterioration determining module determines the occurrence of the local deterioration.

2. The video recorder according to claim 1, wherein the schedule reconfiguration section further comprises: a schedule group extracting module that sets, when any one of the schedules registered by the schedule input section is changed, the changed schedule as a base-node schedule and extracts a schedule group including a plurality of schedules that are connected to the base-node schedule, which have mutual influence on the allocation of the resources with respect to the resource allocated to the base-node schedule on a schedule conflicting network that interconnects registered schedules having time slots that overlap with one another, and
wherein the schedule reconfiguration section concurrently performs the reallocation of resources to be used for performing the programmed recordings for the schedules included in the schedule group extracted by the schedule group extracting module.

3. The video recorder according to claim 1, wherein the schedule reconfiguration section performs the process further comprising:
performing the determination whether the local deterioration occurs while determining sequential reallocation of the resources to the schedules; and
restoring all of the resources that are reallocated to the schedules before the local deterioration was determined to the allocation being set before performing the reallocation.

4. The video recorder according to claim 1, wherein the schedule reconfiguration section performs the process further comprising restoring all of resources reallocated for the schedules in which the local deterioration is occurred to the resources allocated before the reallocation by recursively repeating the restoration for each of the schedules, when the local deterioration is determined in any one of the reallocated resources and when a schedule being allocated with the resource that directly conflicts with the resource in which the local deterioration is occurred is reallocated.

5. The video recorder according to claim 1, wherein the local deterioration determining module determines whether the local deterioration occurs by determining a record rank for each of the schedules, the record rank being at least one of completely recordable, partially recordable, adjacent to other schedule, or completely unrecordable, and by comparing the record rank for a case where the reallocated resources are used and for a case where the resources before the reallocation are used for each of the schedules.

6. The video recorder according to claim 5, wherein the local deterioration determining module determines that the local deterioration occurs when a priority of a schedule having the highest priority among the schedules having improved record ranks is equal to or lower than a priority of a schedule having the record rank being deteriorated by the reallocation.

7. The video recorder according to claim 5, wherein the local deterioration determining module determines that the local deterioration occurs when a priority of a schedule having the highest priority among the schedules having improved record ranks is equal to or lower than any one of priorities of conflicting schedules that is equal to or lower than that of a schedule for which the allocation is changed in a schedule group that newly conflicts with the schedule for which the resource allocation is changed.

8. A method for processing a plurality of schedules for performing programmed recordings to record programs for which start time and end time are designated, the method comprising:
determining an occurrence of a conflict when both of first and second conditions are satisfied, wherein the first condition is satisfied when a first time slot in which a first program included in a given schedule included in the schedules is to be broadcasted and a second time slot in which a second program included in other schedule included in the schedules is to be broadcasted overlap with each other, and wherein the second condition is satisfied when a first resource that is to be used for recording the first program and a second resource that is to be used for recording the second program overlap with each other;

concurrently performing, when the conflict is determined, a reallocation of resources to be used for performing the programmed recordings for the schedules that are affected by a resource allocated to be used for performing the programmed recording for the first schedule based on information representing exclusion relationships between the first schedule and the second schedule;

determining whether a local deterioration in a recording state occurs by performing simulating the recording state obtained when the reallocated resources are used for performing the programmed recordings and comparing the simulated recording state with a recording state obtained when the resources before the reallocation is used for performing the programmed recordings; and restoring the reallocated resources at a part causing the local deterioration to the resources allocated before the reallocation when the local deterioration determining module determines the occurrence of the local deterioration.

* * * * *